(12) United States Patent
Casalini et al.

(10) Patent No.: US 8,268,902 B2
(45) Date of Patent: Sep. 18, 2012

(54) COMPOSITE MATERIAL BASED ON VINYLAROMATIC POLYMERS HAVING ENHANCED THERMAL INSULATION PROPERTIES AND PROCESS FOR THE PREPARATION THEREOF

(75) Inventors: Alessandro Casalini, Mantova (IT); Riccardo Felisari, San Giorgio di Mantova (IT); Dario Ghidoni, Gonzaga (IT); Antonio Ponticiello, Mozzecane (IT); Alessandra Simonelli, Mantova (IT)

(73) Assignee: Polimeri Europa S.p.A. (IT)

( * ) Notice: Subject to any disclaimer, the term of this patent is extended or adjusted under 35 U.S.C. 154(b) by 406 days.

(21) Appl. No.: 12/600,688

(22) PCT Filed: May 15, 2008

(86) PCT No.: PCT/EP2008/003915
§ 371 (c)(1),
(2), (4) Date: Nov. 18, 2009

(87) PCT Pub. No.: WO2008/141767
PCT Pub. Date: Nov. 27, 2008

(65) Prior Publication Data
US 2010/0148110 A1    Jun. 17, 2010

(30) Foreign Application Priority Data
May 18, 2007   (IT) .............................. MI2007A1003

(51) Int. Cl.
*C08J 9/00*   (2006.01)
*C08J 9/16*   (2006.01)
*C08J 9/228*  (2006.01)

(52) U.S. Cl. ................ 521/60; 521/56; 521/59; 521/79; 524/1

(58) Field of Classification Search .................... 521/56, 521/59, 60; 524/1
See application file for complete search history.

(56) References Cited

U.S. PATENT DOCUMENTS

| | | | |
|---|---|---|---|
| 2,656,334 A | 10/1953 | D'Aleho | |
| 3,817,965 A | 6/1974 | Mace et al. | |
| 4,005,183 A | 1/1977 | Singer | |
| 4,360,611 A | 11/1982 | Wakimoto et al. | |
| 5,108,673 A | 4/1992 | Wegmann | |

(Continued)

FOREIGN PATENT DOCUMENTS
CA   2 142 944 C   8/1995

(Continued)

OTHER PUBLICATIONS

Lojkowski, W. et al., "Eighth Nanoforum Report: Nanometrology," *European Nanotechnology Gateway* (Nanoforum.org,), Jul. 2006, cover and pp. 1-127.

(Continued)

*Primary Examiner* — Randy Gulakowski
*Assistant Examiner* — Kara Boyle
(74) *Attorney, Agent, or Firm* — DLA Piper LLP (US)

(57) ABSTRACT

Expandable particle composite material suitable for the preparation of expanded materials having a density lower than 40 g/l and a content of closed cells of at least 60%, including heterophase cavities and/or heterophase domains, whose matrix is a synthetic thermoplastic resin having at least 60% by weight of a vinyl aromatic polymer and in which an expanding system is contained, together with a heterogeneously distributed graphite material, having a graphitization degree, calculated by means of the Maire and Mering formula, of at least 0.2.

36 Claims, 11 Drawing Sheets

U.S. PATENT DOCUMENTS

| | | | |
|---|---|---|---|
| 5,312,678 A | 5/1994 | McCullough, Jr. et al. | |
| 5,573,790 A | 11/1996 | Wehtje et al. | |
| 5,597,236 A | 1/1997 | Fasano | |
| 5,795,364 A | 8/1998 | Payne et al. | |
| 5,888,430 A | 3/1999 | Wakayama et al. | |
| 6,037,400 A | 3/2000 | Kitahata et al. | |
| 6,130,265 A | 10/2000 | Glueck et al. | |
| 6,340,713 B1 * | 1/2002 | Gluck et al. | 521/60 |
| 6,414,041 B1 | 7/2002 | Gluck | |
| 6,465,533 B1 | 10/2002 | Eberstaller et al. | |
| 6,521,672 B1 | 2/2003 | Gluck et al. | |
| 6,897,014 B2 | 5/2005 | Yanagi et al. | |
| 2001/0036970 A1 | 11/2001 | Park | |
| 2003/0157015 A1 | 8/2003 | Reinheimer et al. | |
| 2005/0123638 A1 | 6/2005 | Casalini | |
| 2005/0140039 A1 * | 6/2005 | Casalini | 264/51 |
| 2005/0156344 A1 | 7/2005 | Dietzen et al. | |
| 2006/0167123 A1 | 7/2006 | Dietzen et al. | |
| 2007/0112082 A1 | 5/2007 | Hahn et al. | |
| 2007/0238794 A1 | 10/2007 | Hahn et al. | |

FOREIGN PATENT DOCUMENTS

| | | |
|---|---|---|
| CN | 1767757 A | 5/2006 |
| DE | 9305431 U1 | 8/1994 |
| DE | 10 2004 034 514 A1 | 2/2006 |
| EP | 0 126 459 A2 | 11/1984 |
| EP | 0 620 246 A1 | 10/1994 |
| EP | 0 668 139 A1 | 8/1995 |
| GB | 1006926 A | 10/1965 |
| GB | 1048865 A | 11/1966 |
| GB | 1062307 A | 3/1967 |
| JP | 63-183941 A | 7/1988 |
| WO | 90/06339 A1 | 6/1990 |
| WO | 91/12289 A1 | 8/1991 |
| WO | 94/13721 A1 | 6/1994 |
| WO | 96/34039 A1 | 10/1996 |
| WO | 98/51734 A1 | 11/1998 |
| WO | 98/51735 A1 | 11/1998 |
| WO | WO 98-51735 * | 11/1998 |
| WO | 00/29471 A1 | 5/2000 |
| WO | 00/43442 A1 | 7/2000 |
| WO | 03/085681 A1 | 10/2003 |
| WO | 2004/005384 A1 | 1/2004 |
| WO | 2004/022636 A1 | 3/2004 |
| WO | 2004/087798 A1 | 10/2004 |
| WO | 2006/073712 A1 | 7/2006 |
| WO | 2006/108672 A2 | 10/2006 |

OTHER PUBLICATIONS

Mishma, S. et al., "Carbon Black-Containing Polystyrene Beads," *Chemical Abstracts*, 1987, vol. 106, p. 12 (abstract only).

Kirk Othmer, "Carbon Black," Encyclopaedia of Chemical Technology, John Wilsey and Sons, Fourth Edition, vol. 4, pp. 1037-1074.

E. Fitzer et al., "Recommended Terminology for the Description of Carbon as a Solid," Pure & Appl. Chem., 1995, vol. 67, No. 3, pp. 473-506.

André Bakker et al., "Laminar Flow in Static Mixers with Helical Elements," The Online CFM Book (www.bakker.org/cfm), 1998.

J.Y. Huang, "HRTEM and EELS Studies of Defects Structure and Amorphous-like Graphite Induced by Ball-milling," Acta mater, 1999, vol. 47, No. 6, pp. 1801-1808.

B. Sukumaran et al., "Quantitative Characterisation of the Geometry of Discrete Particles," Geotechnique, 2001, vol. 51, No. 7, pp. 619-627.

Y.T. Lee et al., :Improved Cycling Behaviour for Li-Doped Natural Grahite Anode for Lithium Secondary Batteries, Abs. 68, 204th Meeting, 2003, The Electrochemical Society.

Y. Chen et al., "The Nucleation and Growth of Carbon Nanotubes in a Mechano-thermal Process," Carbon, 2004.

T. Ungár et al., "Size and Shape Crystallites and Internal Stresses in Carbon Blacks," Composites: Part A, 2005, vol. 36, pp. 431-436.

"Eighth Nanoforum Report Nanometrology," Nanoforum. Org, Jul. 2006.

* cited by examiner

US 8,268,902 B2

COMPOSITE MATERIAL BASED ON VINYLAROMATIC POLYMERS HAVING ENHANCED THERMAL INSULATION PROPERTIES AND PROCESS FOR THE PREPARATION THEREOF

RELATED APPLICATIONS

This is a §371 of International Application No. PCT/EP2008/003915, with an international filing date of May 15, 2008 (WO 2008/141767 A2, published Nov. 27, 2008), which is based on Italian Patent Application No. MI 2007 A 001003, filed May 18, 2007, the subject matter of which is incorporated by reference.

TECHNICAL FIELD

This disclosure relates to composite materials based on vinyl aromatic polymers having enhanced thermal insulation properties and to the process for their preparation.

More particularly, the disclosure relates to granules or granulates of composite materials based on vinyl aromatic polymers capable of providing expanded articles having enhanced thermal insulation performances, the process for preparing the composite materials and their use, and to the expanded articles resulting from their use. Enhanced performances in thermal insulation allow a considerable reduction in the density of the expanded material or its thickness without reducing the overall thermal resistance value. Furthermore, the expandable composite materials treated according to the methods described herein have an equal or better processability and an improved capacity of blocking the transmission of infrared radiation compared to similar known expanded materials having the same content of infrared radiation blocking agent.

Typical uses of the expanded materials are thermal insulation of household appliances and industrial equipment, packaging and thermal insulation of buildings.

BACKGROUND

The thermal conductivity of the expanded material is the result of four factors, i.e., gas conduction, polymer conduction, gas convention and electromagnetic radiation in the infrared range.

Gas conduction is the most important contribution but, in general, cannot be easily controlled. In most expanded materials, in fact, polyurethane included, air replaces the entrapped expanding agent with time, thus increasing the thermal conductivity of the same (see, for example, WO 91/12289).

Electromagnetic radiation can be reduced by increasing the scattering or absorption of the incoming electromagnetic waves.

Most organic materials show narrow absorption peaks and are therefore inadequate for interfering significantly with the characteristic infrared spectrum normally found in applications which, on the contrary, show a broad band. Thin layers of metals normally reflect electromagnetic radiations, whereas materials having a high refraction index, such as titanium dioxide or barium sulphate, promote the scattering of infrared radiation (see, for example, U.S. Pat. No. 5,312,678).

The use of carbon black has been known for a long time as a filler or pigment, or also as nucleating agent (see, for example, Chem. Abstr., 1987, "Carbon black containing polystyrene beads"). Carbon black exists in various forms depending on the starting materials and production process (see, for example, Kirk Othmer, Encyclopaedia of Chemical Technology, John Wiley and Sons, fourth edition, vol. 4, pages 1037 to 1074). Among the various types of carbon black, the most important are carbon black from oil combustion ("petroleum black"), carbon black from gas combustion, carbon black from acetylene, lamp carbon black, "channel black," "thermal black" and electrically conductive carbon black.

These carbon blacks have diameters ranging from about 10 to 1,000 nm and very different specific surfaces (from 10 to 2,000 m$^2$/g) in relation to the manufacturing process. These differences cause different blocking capacities of infrared waves, however, the results obtained by various authors are not consistent (see, for example, WO 90/06339, WO 94/13721 and WO 04/087798).

It is known that graphite can also be used as a black body effectively (as described, for example, in JP 63/183941, WO 04/022636, WO 96/34039). However, its use as attenuating agent of infrared radiation in polymeric foams is more recent.

GB 1,006,926 describes compositions containing materials, such as metals, $Fe_2O_3$ and graphite, which show a high absorption capacity of energy coming from an electromagnetic field.

GB 1,048,865 states that many fillers, particularly those of an inorganic origin, are opaque to infrared radiation. As a result, a polystyrene foam filled with those substances not only has a lower density, but also a better thermal insulation power with respect to non-filled polystyrene foams. Graphite is among the cited fillers.

JP 63-183941 is among the first to propose the use of various additives, active in blocking infrared rays in wavelengths ranging from 6 to 14 microns, thus obtaining thermally insulating thermoplastic resins capable of maintaining a low thermal conductivity permanently. Among all the additives, graphite is the preferred material.

DE 9305431U describes a method for preparing expanded molded articles having a density lower than 20 g/l and a reduced thermal conductivity. This result is achieved by incorporating an athermanous material, such as graphite and carbon black, in rigid polystyrene foam.

WO 96/34039 describes microcellular foams containing an infrared attenuating agent and a method for the use of the same. The infrared attenuating agent is coal or graphite, selected to have a good dispersion of the same in the polymeric matrix.

WO 98/51735 describes expandable polystyrene particulates containing 0.05-25% by weight of particles of synthetic or natural graphite, homogeneously distributed in the polystyrene matrix. Preferably, the graphite has an average diameter of 1 to 50 microns, an apparent density ranging from 100 to 500 g/l and a surface area ranging from 5 to 20 m$^2$/g.

WO 00/43442 describes expandable polystyrene compositions containing up to 6% of aluminium particles. Optional infrared attenuating agents include up to 2% of $Sb_2S_3$ and also carbon black or graphite.

US 2001/036970 describes foams having a good balance between sound absorption capacity, a low thermal conductivity and generally a low water content. Active additives in infrared are graphite, titanium dioxide and all carbon blacks known in the art, such as furnace carbon black, acetylene carbon black and "thermal blacks."

From the documentation cited, it appears evident the use of graphite and carbon black as attenuating agents of infrared radiation in foams. However, there is little evidence about the relationship between the use of these athermanous materials and their actual efficacy in blocking the infrared radiation when they are incorporated into the foams.

Both carbon blacks and graphite can contain graphite crystallites, that is regular layers having a rhombohedral or hexagonal lattice of the so-called graphene sheets. The content of crystallite phase and the coherence in the stacking of the layers is limited, in particular for carbon blacks and cokes (see, for example, "Size and shape of Crystallites and Internal Stresses in Carbon Blacks", T. Ungara, J. Gubiczab, G. Tichyb, C. Panteac, T. W. Zerda—Composites: Part A, 2005).

Both the content of the crystallite phase and the stacking coherence can be increased under specific conditions (for example, by means of thermal treatment over 2,000° C.). However, only some types of pitches, cokes and coals can increase their graphitic degree by means of thermal processes (see, for example, "Recommended Terminology for the Description of Carbon as a Solid" from IUPAC Recommendations, 1995).

Graphite crystallites are easily broken by mechanical shear action or by means of chemical expansion of intercalate compounds. The hexagonal structure is thus subdivided into very small scales, until a substantially amorphous structure is generated, corresponding to a typical coherence length of the crystal of less than 5 nm and a stacking length of the crystal of less than 2 nm, as described in Y. Chen, M. J. Conway, J. D. Fitzgerald, J. S. Williams, L. T. Chadderton "The nucleation and Growth of Carbon Nanotubes in a Mechano-Thermal Process", Carbon (2004) and in J. Y. Huang, "HRTEM and EELS Studies of Defect Structure and Amorphous Like Graphite Induced by Ball Milling", Acta mater, Vol. 47, Nr. 6 (1999).

The above-mentioned crystallites have a strong interaction with the electromagnetic waves not only in the infrared spectrum. In particular, it is known, for example, from U.S. Pat. No. 4,005,183, that not succeeding in aligning the coal planes in a crystallite with respect to any other plane, prevents the material from developing typically graphitic properties, such as high thermal and electrical conductivity and electromagnetic coupling.

Useful instruments for analyzing the graphitic structure include Raman spectroscopy and X-ray diffraction, from whose analysis it is possible to compute the crystallographic parameters of the graphite crystallites and the dimensions of the same (see, for example, "Eighth Nanoforum Report Nanometrology", July 2006, Nanoforum Org.).

It is possible to disperse many organic and inorganic compounds in graphite material, to obtain a composite (see, for example, U.S. Pat. No. 5,888,430). A more restricted group of these compounds show a molecular hindrance which is compatible with the hexagonal crystalline structure and with the inter-layer distance of graphene. In this case, an intercalate compound of graphite (GIC, i.e., Graphite Intercalate Compound) is formed and described in, for example, US 2003/0157015. These compounds can improve the compatibility of graphite in the polymeric matrix, or the thermal and electric conductivity.

The dispersion and/or intercalation of molecules inside the graphene layers may have a significant impact on the crystallite morphology (see, for example, "Improved Cycling Behaviour for Li-Doped Natural graphite Anode for Lithium Secondary Batteries", Y. T. Lee, C. S. Yoon, S. H. Park, Y. K. Sun, Abs. 68, 204$^{th}$ Meeting, (2003) The Electrochemical Society).

Graphite can be incorporated into expanded polymeric matrixes in several ways. It can be added as an external additive on the polymeric beads before expansion and molding. In this way, however, the graphite material is not uniformly distributed and consequently the efficacy of the athermanous agent is reduced.

A common process consists of incorporating the graphite, together with an expanding agent, into a composition based on vinyl aromatic or urethane polymers, mixing all the additives carefully in the molten polymer, cooling and expanding, as described, for example, in JP 63-183941, GB 1,006,926 or WO 96/34039.

The beads of vinyl aromatic expandable polymers are mainly produced by means of suspension processes. These processes have been extensively described in the art. The polymerization reaction can be thermally started, through a free-radical or anionic process. Details of these processes can be found in U.S. Pat. Nos. 2,656,334 and 3,817,965.

Processes based on the suspension technology have the drawback of requiring a great quantity of water to be disposed off. Furthermore, a sieving operation is required as spherical beads having a wide diameter distribution are often obtained.

The incorporation of graphite material is a problem, as it inhibits the peroxide catalysis and makes the suspension instable. Many solutions of this problem have been proposed, as mentioned, for example, in U.S. Pat. No. 4,360,611 or in WO 98/51734 or WO 00/29471.

The uniform distribution of these pigments, especially at high content, is also a considerable problem (see, for example, WO 94/13721).

An alternative to suspension polymerization is represented by the process which consists of the mixing of a molten polymer with the expanding agent and possibly other additives (such as graphite) and the subsequent granulation of the composition thus obtained (see, for example, GB 1,062,307, U.S. Pat. No. 5,108,673, U.S. Pat. No. 5,573,790 and EP 668,139).

The product obtained from these processes is generally characterized by a cellular structure of the expanded material which is irregular and too large. The dimension of the cell and the cellular structure obtained by the expansion are of decisive importance for reaching ideal insulating properties and a good surface of the expanded material. Consequently, the addition of nucleating agents is frequently required. EP 126,459 describes a method for solving these defects by means of annealing the expandable granulates, under pressure, at a temperature higher than the glass transition temperature of the expandable polymer.

Moreover, the expandable resin leaving the cutting head is difficult to cut into granules, due to its natural tendency to expand. The incorporation of inorganic additives and, in particular, inorganic athermanous additives, makes this operation even more difficult.

WO 00/43442 states that athermanous materials have a strong nucleation effect, as a result, that underwater granulation, under pressure, is necessary to prevent expansion in the cutting chamber itself.

This method includes a particular cutting head, where the expandable resin is extruded through a large number of small holes. It is known that this method is difficult, as the surface temperature of the cutting head is very close to the temperature of the water, which, in turn, is normally close to the solidification temperature of the polymer.

Furthermore, the polymeric flow in the holes of the cutting head is at very high shear rate, as the diameter of the holes must be very limited to obtain a bead size suitable for various applications. Therefore, according to WO 00/43442, it is not possible to obtain particle size under 1 mm with this type of granulation.

Similarly, US 2005/0156344 describes the influence of the geometry of die holes (such as hole diameter, L/D ratio, inlet and outlet cone angles), the temperature of the molten product and plasticizers, on the swelling and therefore on the final diameter of the bead. It is stated that expandable resins may contain many additives. There are no examples, however, of granulates containing graphite materials.

The above-mentioned WO 98/51735 describes expandable styrene polymers containing particles of synthetic or natural graphite, homogeneously distributed in polystyrene. These compositions are obtained by mixing graphite in styrene according to an aqueous suspension process, or by mixing graphite and expanding agent in polystyrene in an extruder, with a subsequent granulation of the so-obtained composition. In the few examples relating to products manufactured according to this second procedure, the graphite content is limited to 2%.

Furthermore, as the thermal conductivity of graphite materials is typically several orders of magnitude higher than that of polymers, a polymeric foam having a high content of graphite material can show a higher overall thermal conductivity, especially at a density of the expanded material higher than about 20 g/l, if compared with a similar product but with a lower content of athermanous agent. Consequently, if, on the one hand, the use of these athermanous agents decreases the resulting conductivity in the expanded foam by reduction of the infrared transmission, on the other hand, it causes its increase by an increment in the conductivity of the solid material.

To ensure an improved thermal insulation, it is therefore fundamental not only to control the concentration of the athermanous material, but also its localization in the polymeric matrix. To our present knowledge, so far no effective solution has been proposed for solving these problems, in the group of relevant products.

It could therefore be helpful to provide granulates of expandable composite materials based on vinyl aromatic polymers, to which an agent has been added to improve the thermal insulation, which, after further transformation, allow low-density, expanded articles to be prepared having a thermal conductivity sufficiently low to be used for obtaining enhanced thermal insulation properties.

It could also be helpful to provide granulates of expandable composite materials from which, after further transformation, expanded panels can be obtained, having a high thermal insulation performance, to satisfy national standards, with a minimum thickness of the panel and at a cost compatible with commercially available products.

It could further be helpful to provide expandable composite materials which, in their final form of expanded article, after expansion and molding, satisfy the self-extinguishing specifications of the B2 test, according to the regulation DIN 4102 part 2, with a reduced use of self-extinguishing additives.

It could yet further be helpful to provide expandable composite materials which, after expansion and molding, allow expanded articles to be obtained which do not present undesired worsening in mechanical properties.

It could still further be helpful to provide a process for the production of granules of expandable composite materials mentioned above, as well as the expanded articles obtained from the granules after expansion and molding, having a high content of closed cells and a homogeneous cellular dimension, in the range from 60 to 400 microns.

SUMMARY

We provide an expandable granular composite material having a polymeric matrix suitable for preparing expanded articles having a density lower than 40 g/l and a content of closed cells of at least 60% as determined according to ASTM D-2856 including heterophase domains including materials not completely miscible with the polymeric matrix, and/or cavities, embedded inside the polymeric matrix, wherein the polymeric matrix is a thermoplastic synthetic polymer having at least 60% by weight, with respect to the overall weight of the matrix, of a polymer deriving from a vinyl aromatic polymer, wherein the composite material contains an expanding system and graphite material not homogeneously distributed, having a graphitization degree, calculated by the Maire and Mering formula, of at least 0.2.

We also provide a method for producing the expandable granular composite materials, including a. mass/solution polymerizing a vinyl aromatic monomer and, optionally, co-monomers, together with a graphite material, whose main portion is fed as a concentrate; b. devolatilizing the partially reacted composition in a devolatilizer; c. cooling the resulting composition to a temperature ranging from Tc−25° C. to Tc+25° C., wherein Tc is a critical temperature of an expanding system; d. adding the expanding system to the cooled composition and, optionally, other additives selected from the group consisting of vinyl aromatic and non-vinyl aromatic polymers, flame-retardants, antioxidants, nucleating or lubricating agents, maintaining the pressure above the critical pressure of the expanding system; e. mixing the additives and the expanding system with the polymeric composition by means of static or dynamic mixers for a selected minimum residence time; f. optionally, cooling the resulting mixture to at least 50° C. more than the glass transition temperature of the vinyl aromatic polymer; g. extruding the mixture through die holes, the diameters of the holes being with the range of 0.3 to 1.5 mm; and h. reducing the extruded mixture to granules having a volume ranging from 0.03 to 8 $mm^3$ with a set of rotating knives, in an interrupted water spray granulator, pressurized at over 1.5 barg.

DETAILED DESCRIPTION

Figure 1:
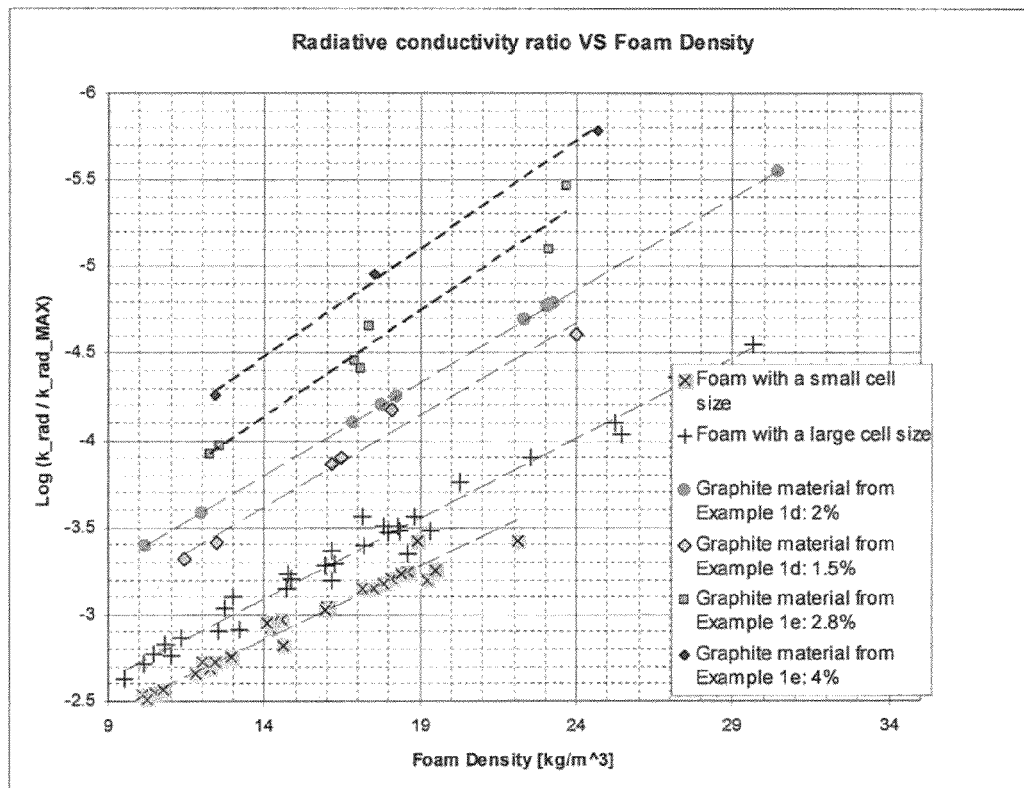
FIG. 1 is a graph showing normalized logarithmic radiative conductivity versus foam density for some foams resulting from the processing of the corresponding particulate expandable composites.

The above-mentioned and other advantages will appear evident from the following description, wherein the contents of this disclosure are described in detail and illustrated in the enclosed drawings. Variations in the procedures, structural characteristics and arrangement of the parts are within the parview of those skilled in the art, as are advantages obtained by the use of the same.

We have now found that the above aspects can be achieved through the development of granulates based on expandable vinyl aromatic polymers containing graphite materials not homogeneously dispersed in the matrix according to a pre-determined and controlled scheme to provide adequate attenuation to infrared rays and control of the cellular morphology of the foam, and through the method required for the production of the granulates.

The article obtained from the expansion and molding of the granulates exhibits an enhanced thermal insulation performance, whereas it limits the quantity of additive required for blocking infrared radiation.

In particular, it has been observed that these good results can be obtained when the graphite material is used from a master batch or concentrate, having specific chemical and rheological characteristics and is distributed in the expandable composition, according to a pre-determined scheme.

The thermoplastic polymers include polymeric materials based on aromatic alkenyl compounds, in particular, homopolymers and copolymers of alkenyl aromatic compounds and unsaturated co-polymerizable co-monomers.

Examples of co-polymerizable co-monomers include butadiene, ethylene, vinyl acetate, maleic anhydride, (meth) acrylic acid, $C_1$-$C_4$ alkyl esters of (meth)acrylic acid, such as methyl acrylate, methyl methacrylate, ethyl acrylate, ethyl methacrylate, isopropyl acrylate, butyl acrylate, amides and nitriles of (meth)acrylic acid, such as acrylamide, methacrylamide, acrylonitrile, methacrylonitrile. The preferred co-polymerizable monomers are acrylonitrile, butyl acrylate and methyl methacrylate.

Compositions of alkenyl aromatic polymers and minor proportions of non-alkenyl aromatic polymers are possible. One or more alkenyl aromatic homopolymers, one or more alkenyl aromatic co-polymers, blends of one or more alkenyl aromatic homopolymers or copolymers or blends of any of the previous products with a non-alkenyl aromatic polymer, can be used.

Among suitable alkenyl aromatic polymers there are those deriving from vinyl aromatic compounds, such as styrene, divinyl benzene, α-methyl styrene, bromostyrene and ethylstyrene. Among them, divinyl benzene, α-methyl styrene and styrene are preferred. Lower quantities of mono-unsaturated compounds, such as terpenes, alkyl acids and esters can be co-polymerized with the vinyl aromatic monomer.

The resulting alkenyl aromatic or vinyl aromatic polymer has a weight average molecular weight (Mw) ranging from 80,000 to 400,000, preferably from 100,000 to 260,000.

Other polymers, such as polyphenylether, can be added to improve certain characteristics such as the mechanical rigidity or thermo-resistance. Preferably, polyphenylene oxide is present in a content ranging from 0.5 to 12%.

The vinyl aromatic composition can include various conventional additives. The additives include chain-transfer agents, branching and nucleating agents. Typical chain-transfer agents comprise alkyl mercaptan, pentaphenyl ethane, and the dimer of α-methyl styrene. Examples of branching agents are butadiene and divinyl benzene.

Finely dispersed particles of some organic and inorganic compounds promote the cellular nucleation and they can therefore be added to regulate the cell dimension. Examples include carbonates, silicates, such as talc and clay, oxides, such as zinc oxide, polar polymers, compounds containing organic bromine, esters of fatty acids and carbon materials, such as aromatic, polycyclic hydrocarbons, cokes, carbon black and graphite.

Some additives can be mixed with monomers and grafted during polymerization or added thereafter.

Particularly suitable as nucleating agents are styrene-butadiene-styrene and styrene-isoprene-styrene block copolymers, which can be grafted during polymerization, and polyethylene waxes having an average molecular weight ranging from 500 to 5,000, which are typically distributed in the polymeric matrix, in a quantity of 0.01 to 1.0% by weight, based on the content of vinyl aromatic polymer, more preferably between 0.01 and 0.6% by weight.

The granulates of expandable composite materials having a vinyl aromatic base are adequately coated with lump preventing and antistatic compositions including silicones, silicates, metal carboxylates and glycerine, metal oxides. Among the carboxylates suitable for the purpose, there are glycerine mono- di- and tri-stearate, zinc stearate and relevant blends. Examples of these compositions have been described in WO 04/005384. Derivatives of adipic, citric and palmitic acid can be used instead of derivatives of stearic acid. The coating compositions are applied through dry mixing, in a continuous or discontinuous mixing screw device.

The infrared blocking compound is a carbonaceous substance, such as carbon black, lamp-black and graphite. The carbonaceous substance is preferably a graphite material, as defined by IUPAC in the already mentioned text "Recommended Terminology for the Description of Carbon as a Solid," IUPAC Recommendations, 1995.

Mainly, this graphite material consists of graphitic carbon, but it can contain smaller quantities of non-graphitic carbon, such as carbon black.

The graphitization degree and the crystalline parameters are calculated in the following way:

a concentrate of graphite material, as described hereunder, is diluted in chloroform and mixed by a magnetic anchor impeller for 24 hrs. The solution is subsequently washed, filtered and dried in an oven for 10 hrs at 500° C., to remove water and other substances insoluble in chloroform.

Subsequently, the material is placed in an X-ray diffractometer. The diffractometric pattern is read between 10° and 70°.

The distance $d_{002}$ between the graphene planes is measured by the angle $\theta_{002}$ according to the Bragg law:

$$\lambda = 2d_{002} \sin \theta_{002}$$

wherein λ is the length for the line Cu K $\alpha_1$, i.e., 0.154 nm.

The highly oriented pyrolytic graphite has an interplane distance of 0.3354 nm. However, normally both natural and artificial graphites show a larger value, due to defects between the planes. As a result, $d_{002}$ is always higher than 0.3354 nm. The difference between the observed interplanar spacing and the reference value of 0.3354 nm is a measurement of the crystallinity and consequently of its graphitization degree.

The graphitization degree "g" is calculated according to the Maire and Mering formula:

$$d_{002} = 0.3354g + 0.3440(1-g)$$

wherein $d_{002}$ is computed from the peak value of the diffractogram curve, after effecting a noise removal and curve fitting procedure.

The stacking height of the crystallite is calculated according to the Sherrer formula:

$$LC_{002}=0.87\lambda/[B_{002}\cos(\theta_{002})]$$

wherein B is the angular width corresponding to an intensity of the signal equal half the maximum intensity and it is approximated by the following formula:

$$B=0.5(2\theta_1-2\theta_2)$$

wherein the two limit values $\theta_1$ and $\theta_2$ are the angles where the intensity of the diffracted signal, calculated on the curve-fitted diffractogram drops to zero.

The crystallite coherence length is calculated in the same way, but on the peak corresponding to the crystalline axis 100 instead of 002.

Table 1 shows graphitization degree, crystallite stacking height and coherence length of various useful (Examples 1a to 1i) and non-useful (Comparative Examples 1a and 1b) graphite materials.

TABLE 1

| Graphite material | Graphitization degree | Lc [nm] | La [nm] |
|---|---|---|---|
| Example 1a | 0.47 | 25 | 44 |
| Example 1b | 0.35 | 22 | 39 |
| Example 1c | 0.65 | 35 | 65 |
| Example 1d | 0.92 | 46 | 74 |
| Example 1e | 0.85 | 53 | 96 |
| Example 1f | — | 11 | 18 |
| Example 1g | 0.89 | — | — |
| Example 1h | 0.88 | — | — |
| Example 1i | 0.81 | — | — |
| Comparative Example 1a | −1.52 | 2.9 | — |
| Comparative Example 1b | −3.02 | 1.9 | — |

The dispersion scheme of the graphite material in the polymer matrix is a crucial aspect. If the graphite material is added as a coating to the expandable material and not embedded inside, an unsuitable distribution is obtained, as the inside of the expanded beads is without graphite material completely. Therefore, the resulting foam has a low sintering degree and is greasy, which makes it not easy to use. On the contrary, embedding graphite material inside the polymer matrix, as in the known processes, a substantially uniform and homogeneous distribution is obtained.

Surprisingly, if the graphite material is distributed in the expandable granulates according to various schemes described hereunder, characterized by an essentially inhomogeneous (not homogeneous) controlled dispersion, typically the resulting foams show equal or better thermal insulation properties, a higher expansion rate, a good sintering degree.

According to a first scheme of controlled inhomogeneity, the granule of expandable composite shows certain gas and/or liquid cavities, embedded in the vinyl aromatic matrix, characterized by a substantial absence of graphite material. The latter is therefore concentrated inside the vinyl aromatic matrix. The distribution of the graphite material can be controlled by varying the dimension and volume of these cavities (see FIGS. 2a and 2b and the comparative example in FIG. 2h for comparison).

Quantitatively, the non-uniform distribution of the graphite material is confirmed by the value of the minimal mixing area, as defined hereunder, which does not reach the values obtained by a homogeneous distribution of graphite material. For instance, compare the values of minimal mixing area inferred from diagrams in FIGS. 2a and 2b, with the comparative example in FIG. 2h.

The volume fraction of the gas cavity is estimated on the basis of the "void fraction" present in the granule of polymeric composite material.

The void fraction is calculated by means of the following equation:

$$\alpha=1-(\rho/\rho_{REF})$$

wherein $\rho$ is the mass density of the granule of polymeric composite material, and $\rho_{REF}$ is the reference density, wherein the reference is the density of the mass granule of the polymeric composite, without the graphite material.

The produced granules show a void fraction ranging from 0.5 to 20%, preferably from 2 to 16%. The average diameter of the cavity typically varies from 2 to 90 micrometers, more typically from 4 to 50 micrometers. The cavities are characterized by an ovoid shape, as can be deduced from the images obtained at an optical microscope (see FIGS. 2a and 2b).

The expandable polystyrene beads prepared using a different technology (for example, expandable polystyrene obtained in suspension) can also show voids, but these are much smaller (typically, about 2 micrometers in diameter) and represent, on the whole, a very small volume with respect to the volume of the solid phase. This volume is difficult to measure, but approximately it can be calculated as being about 0.1% by volume. As a result of the size and number of the voids, these are not capable of influencing the degree of controlled inhomogeneity.

The size, distribution and volume of the cavities can be controlled by varying the process conditions (Table 4) and the recipe (Table 2).

In particular, a temperature of the molten product which is too low (for example, lower than 160° C.) is unfavorable for the formation of The cavities. This effect is enhanced by a reduction of the gas flow-rate in the cutting chamber to less than 2 kg of nitrogen per 1 kg of extruded polymer. On the contrary, a high temperature of the polymer (for example, more than 200-220° C.), leads to the formation of cavities having irregular dimensions and damages the shape of the resulting expandable particles. A pressure drop of the polymer through the die holes of more than about 150 bar enhances the dimensional homogeneity and the cavity distribution, but, at the same time, opposes the formation of the cavities themselves.

In a second scheme of controlled inhomogeneity, possibly together with the cavities, the composite contains domains consisting of materials which are substantially incompatible or insoluble in the vinyl aromatic matrix and that therefore produce separate phases.

The form and size of the domains incompatible with the vinyl aromatic matrix can be controlled, within certain limits, by varying the viscosity ratio between the phases, the interfacial tension and the volume ratio.

Figure 2A:
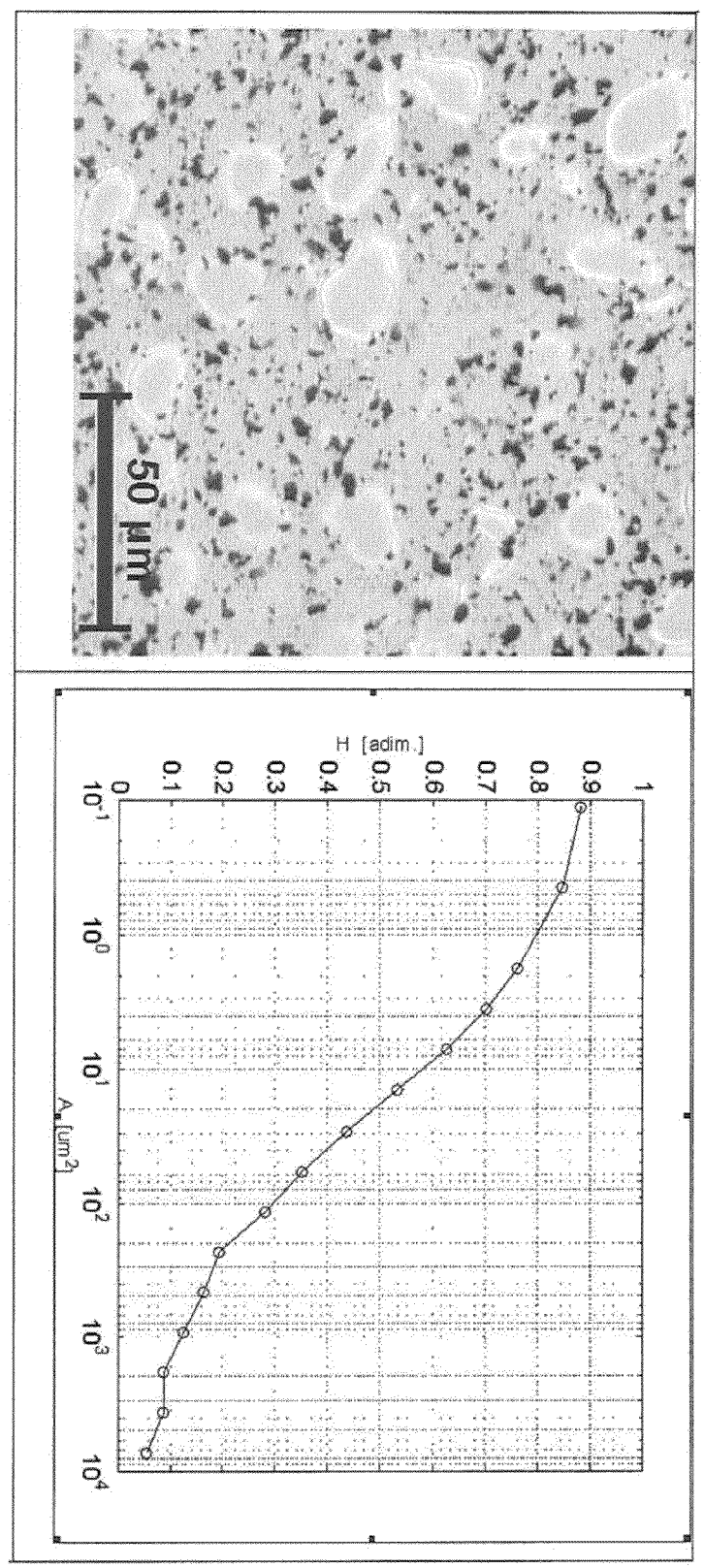
FIG. 2a is an image taken with an optical microscope of the product obtained from Example 8 and a corresponding mixing diagram with respect to the region area.
Figure 2B:
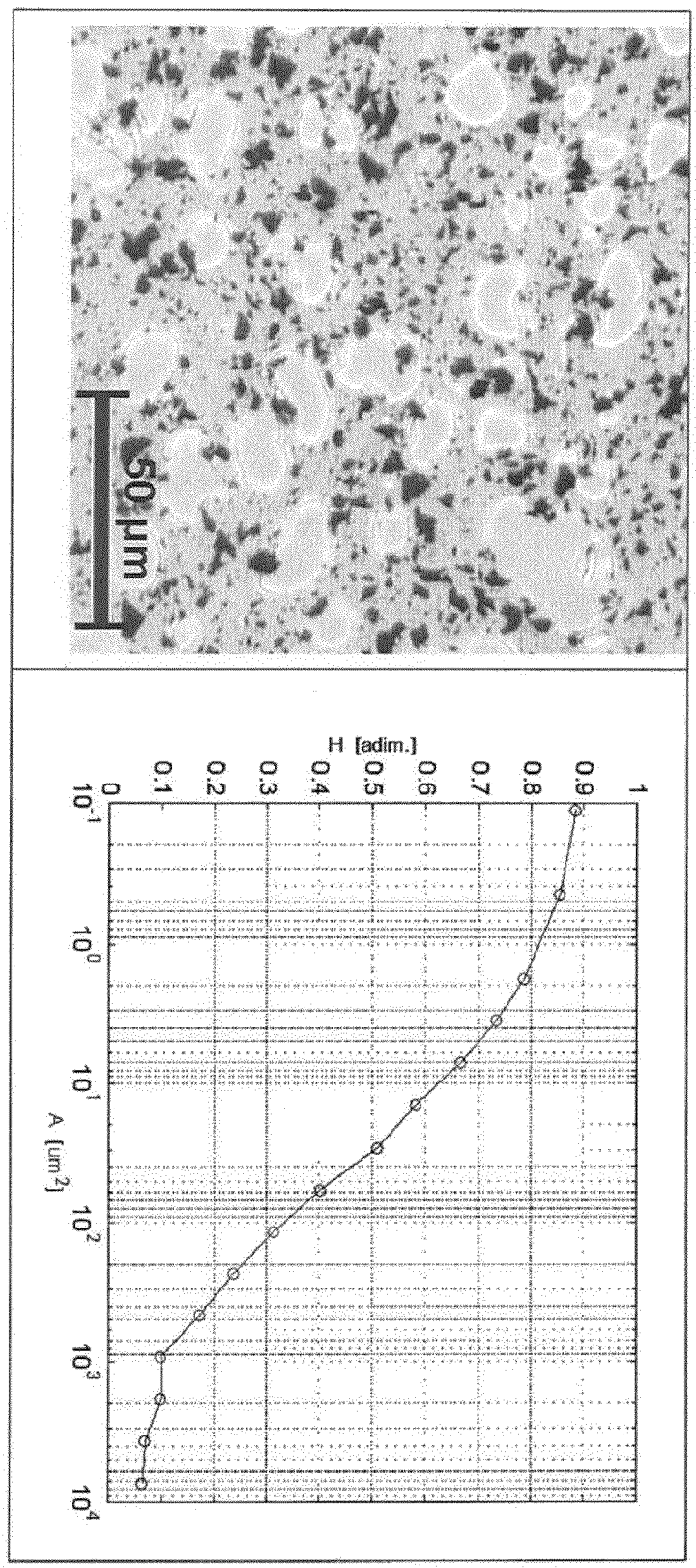
FIG. 2b is an image taken with an optical microscope of the product obtained from Example 10 and a corresponding mixing diagram with respect to the region area.
Figure 2C:
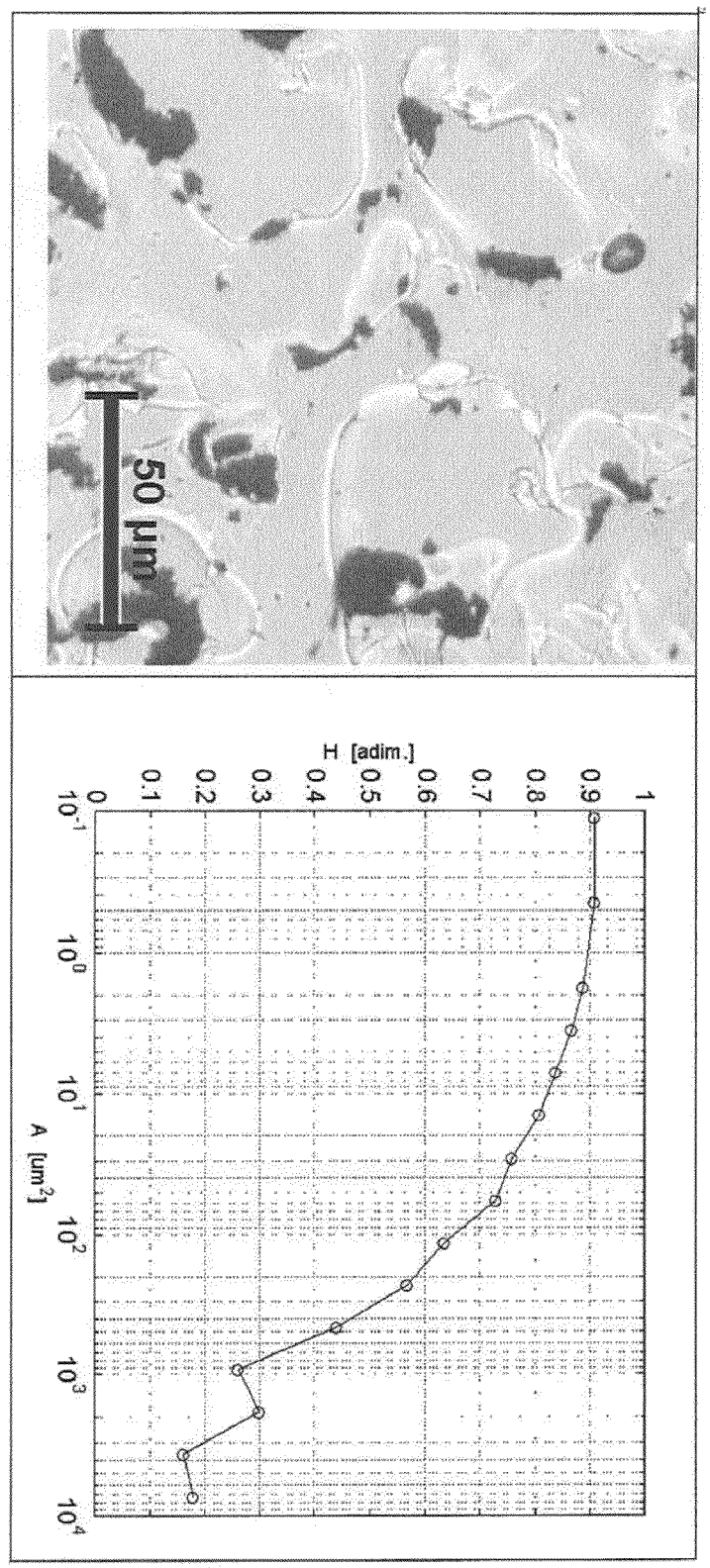
FIG. 2c is an image taken with an optical microscope of the product obtained from Example 21 and a corresponding mixing diagram with respect to the region area.
Figure 2D:
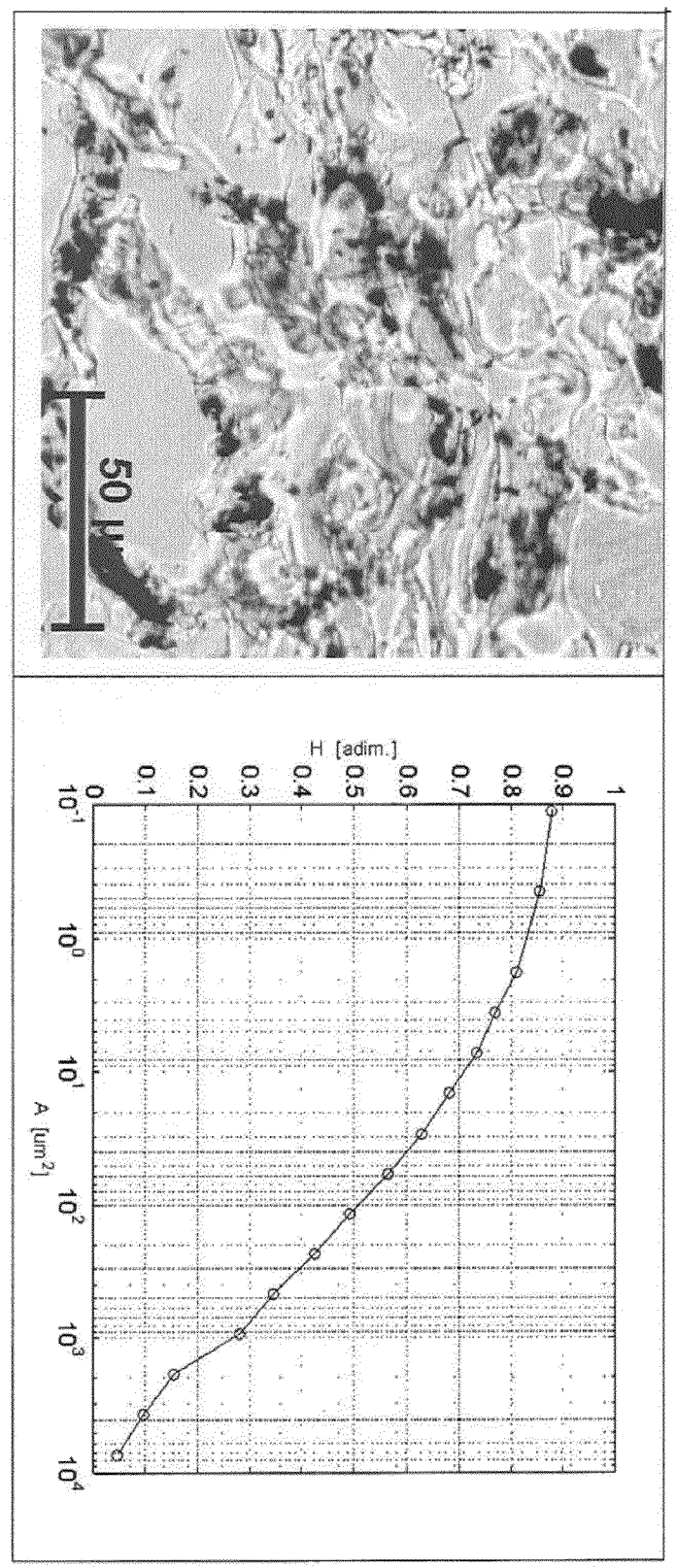
FIG. 2d is an image taken with an optical microscope of the product obtained from Example 22 and a corresponding mixing diagram with respect to the region area.
Figure 2E:
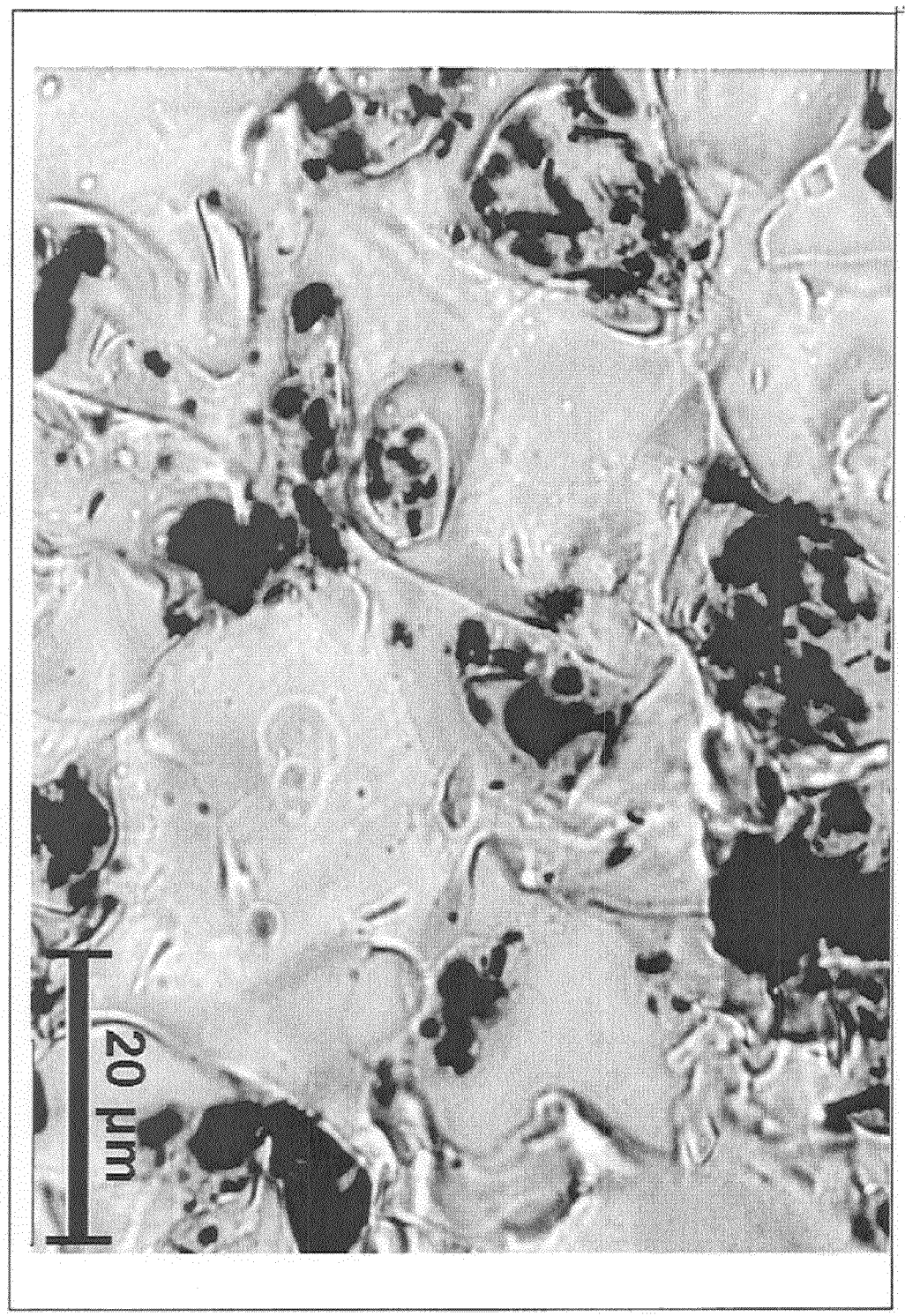
FIG. 2e is an image taken with an optical microscope of the product obtained from Example 22.
Figure 2F:
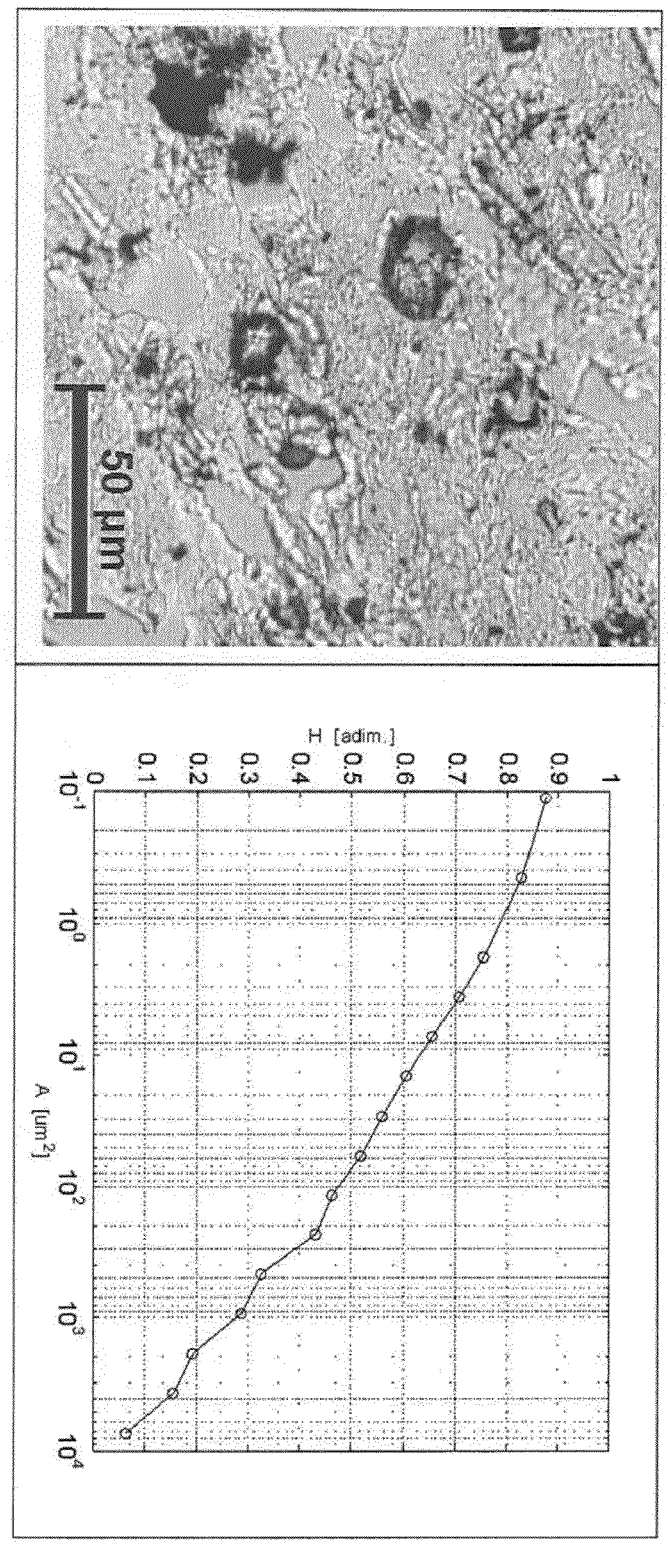
FIG. 2f is an image taken with an optical microscope of the product obtained from Example 23 and a corresponding mixing diagram with respect to the region area.
Figure 2G:
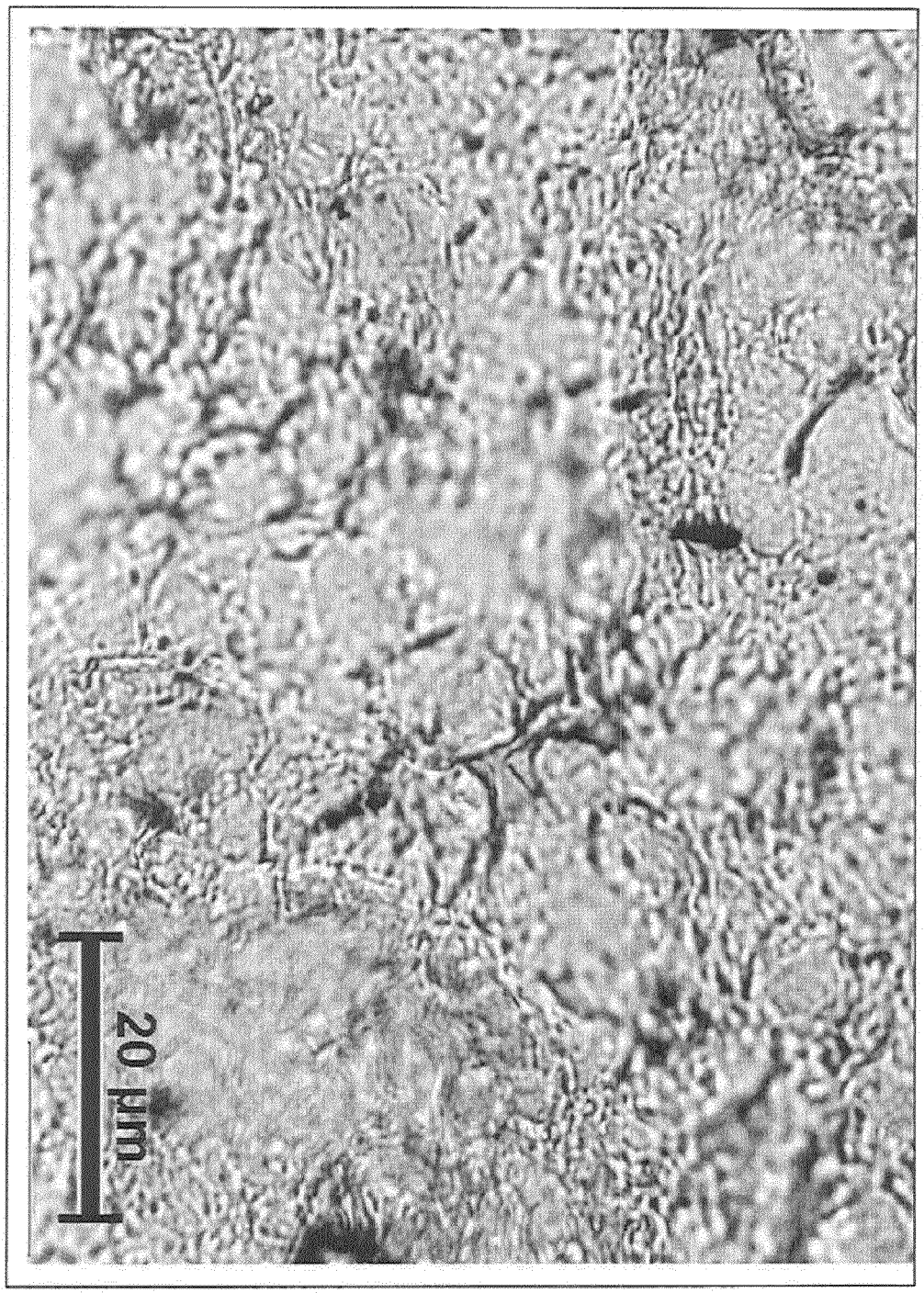
FIG. 2g is an image taken with an optical microscope of the product obtained from Example 23.

Surprisingly, the graphite material is preferably distributed in the domains rather than in the vinyl aromatic phase, as can be seen, in particular, in FIGS. 2e and 2g. Therefore, the control of the size of the domains of the phase incompatible with the vinyl aromatic matrix defines, as a consequence, the distribution of the domains of graphite material. In this way, it is possible to control the inhomogeneity of the distribution of the graphite material.

Process conditions and the typology of product used for embedding the graphite material have a considerable effect also on the arrangement of the graphite material inside the product, so that it is possible to obtain aggregates having a small size (for example, as in FIG. 2e), or big size (for example, as in FIG. 2c). Furthermore, in both cases, the graphite material substantially remains inside the immiscible phase.

The use of known processes for the production of expandable particulates, both in suspension and in continuous mass, do not allow the production of composites having the properties mentioned herein. Even using graphite materials having a high particle-size, or a blend of graphite materials having different particle-sizes, the resulting distribution in the polymeric matrix would be substantially uniform, or, in any case, would remain uncontrolled.

On the contrary, we provide expandable composite materials wherein the graphite material is dispersed according to the schemes of controlled inhomogeneity, and to the methods for producing the composite materials.

These schemes of controlled inhomogeneity are useful when quantities of graphite material higher than 1% by weight are used, with respect to the overall weight of the expandable composite material, and more particularly when the quantity is higher than about 3% by weight.

The graphite material is incorporated in a suitable product, which is possibly granulated and/or stored, to produce a composite material as described above. The concentrate of graphite material thus obtained is subsequently mixed with the monomer or vinyl aromatic polymer flow.

Alternatively, the graphite material concentrate is formed in situ and directly added to the vinyl aromatic polymer. In this way, the running costs can be reduced, in general at the cost of lower operative flexibility.

The concentrate can be a polymeric master batch or a colloidal or non-colloidal dispersion containing the graphite material.

Both for the colloidal dispersion and for the non-colloidal dispersion, the particle of graphite material is generally covered by a layer of stabilizer which prevents agglomeration. The colloidal dispersions show little or no deposit, even after a long shelf-time, whereas non-colloidal dispersions only require light stirring to disperse the largest sediments.

Useful dispersing agents include inorganic solvents, such as water (for example, colloidal graphite Acheson Deltaforge GP-157) or certain organic compounds. If hydrophilic solvents are used, sorbitol-$C_8$-$C_{20}$-carboxylates and sulphurated $C_8$-$C_{20}$-alkylxylenes can be added for the purpose of improving the compatibility of the colloidal composition with the vinyl aromatic matrix.

Preferably, the viscosity of the colloidal or non-colloidal dispersions of the graphite material is higher than about 100 cP. It may be useful to pre-mix part or all of the expanding system in the graphite material.

The viscosity can be controlled by thickening agents, such as petroleum jelly, fatty acids and the corresponding esters. Stearic and palmitic acids are particularly useful for this purpose. Colloids based on water can be thickened by means of inorganic salts and silicon, magnesium, aluminium oxide compounds, such as talc, pyrophillite, hydrotalcite and montmorillonite. The required amount of thickening agent depends on the type and quantity of the solvent in the dispersion. For aqueous dispersions the ratio between the thickener and the solvent typically ranges from 0.015 to 0.25.

Among the above cited agents, preference is given to fatty acids and relative esters and talc.

Pastes of graphite material can be used effectively. These pastes are colloidal dispersions of graphite material in appropriate mediums, such as polyalkylene glycol wherein the alkenyl group contains from 2 to 5 carbon atoms and has a molecular weight ranging from 400 to 10,000, and relative esters, polyethylene glycol or polypropylene glycol (for example, Acheson DAG197), mineral essences (for example, Acheson DAG 2404®), petrolatum (for example, Acheson GP460®), triglycerides, petroleum oil (for example, Acheson DAG170®) synthetic fluids of polybutylene, saturated or non-saturated fatty acids ($C_{10}$-$C_{20}$) and relative esters, with lower alcohols ($C_1$-$C_4$) or inorganic salts, such as sodium palmitate or zinc stearate; esters of sorbitane.

It is possible to produce composite materials showing one of the two schemes of controlled inhomogeneity mentioned before, or a combination of both, according to the viscosity and the chemical affinity of the concentrate of graphite material with respect to the vinyl aromatic matrix.

For example, to obtain composite materials according to the first scheme of controlled inhomogeneity it is expedient to use master batches of graphite material which have as base a polymeric resin which is substantially compatible with the vinyl aromatic polymer of the matrix, such as, for example, polystyrene and its alloys with polyphenyl ether.

Advantageously, it is possible to mix the resin with the expandable polystyrene beads resulting from the suspension polymerization of the same and which do not meet the product specifications (for example, the undesired fractions).

Waste expanded or compact polystyrene articles, or the relative processing off-cuts can be suitably crushed and then incorporated into the above-mentioned polymeric resin.

Advantageously, to obtain composite materials according to the second scheme of controlled inhomogeneity, it is possible to use master batches having, as base, a polymer which is non-miscible in vinyl aromatic resins, or only partially miscible co-polymers. Examples of these polymers include: polyethylene (PE); poly(ethylene-vinyl acetate) (EVA); polypropylene; relative blends and inter-polymers PS/PE (HIPS/PE) or PS/EVA; SAN; ABS; polymethyl-methacrylate; polyesters; polycarbonate from Bisphenol-A, polyamides 6, polyamides 66, PET (polyethylene-terephthalate), PBT (polybutylene-terephthalate), PCL (polycaprolactone) and relative blends; saturated SBS copolymers (Styrene-Ethylene-Butylene-Styrene); SEP (Styrene-Ethylene-Propylene); styrene-butadiene, styrene-isoprene and styrene maleic anhydride co-polymers, and, in general, thermoplastic rubbers containing styrene.

Preferred polymers which are non-miscible in vinyl aromatic resins, or only partially miscible co-polymers include: polyethylene, poly(ethylene-vinyl acetate), high impact polystyrene, Styrene-Ethylene-Butylene-Styrene, styrene-isoprene, styrene-butadiene co-polymers and styrene maleic anhydride co-polymers.

The non-miscible or not completely miscible materials which may be embodied in the expandable composite should be in the range from 1 to 40 percent, preferably 5-30 percent, with respect to the total weight of the resulting composition.

In a first example, the polymeric master batch of graphite material is obtained by mixing a polymeric resin (compatible or non-compatible with the vinyl aromatic resin) and the particles of graphite material in a twin- or single screw extruder with mixing elements, or in a static mixer. In this way, it is possible to produce stable master batches with a content of up to about 55% of graphite material by weight with respect to the overall weight of the resulting polymeric master batch.

In the master batch, plasticizers or waxes can be used partially instead of the polymer. In this way, the content of graphite material in the master batch can be increased to up to 70% by weight with respect to the overall weight of the resulting polymeric master batch, with an unchanged or improved processability. Suitable plasticizers are phthalic esters such as n-butylbenzylphthalate, bis(n-butyl)phthalate, diiso-butylphthalate, dioctylphthalate, diisodecylphthalate, and di-2-ethyl-exylphthalate; non-phthalic compounds, such as adipates, for example, dioctyl-adipate, terephthalates such as dioctyl terephthalate, trimellytates, terpenes such as geraniol, limonene, farnesol and citrates.

The plasticizers are preferably used in a quantity ranging from 0.1 to 10 parts by weight with respect to 100 parts by weight of the graphite material.

A dispersing agent can be added to help the dispersion of the graphite material inside the resin.

Non-limiting examples include organic dispersing agents such as polyvinyl alcohol, methyl cellulose and polyvinyl pyrrolidone, as well as unsaturated monomers containing at least one type of ionic functional group, selected from the group of tertiary amines, quaternary ammonium salts and sulphuric acid. The ionic functional group is preferably selected from the group of N,N-dimethylaminoethyl (meth) acrylate, N,N-diethylaminoethyl (meth)acrylate, N,N-dimethylaminoethyl (meth)acrylamide, 2-(methacryloyloxy) ethyl trimethylammonium dimethylphosphate, 2-acrylamide-2-methylpropanesulphonic acid and 2-sulphoethyl (meth)acrylate.

Some dispersing agents can act as lubricants for polymers. This group includes ricinoleic acids, such as castor oil, amides of long-chain carboxylic acids, cetylic acid, stearylic acid and some esters of phthalates. Among these, ethylene-bis-stearamide and castor oil are preferred.

The dispersing agent is preferably used in quantities ranging from 0.05 to 10 parts by weight, based on 100 parts by weight of the graphite material.

Advantageously, the above-mentioned scheme of controlled inhomogeneity can be promoted when carbon black is added to the graphite material. The following types of carbon black are effective for this purpose: thermal carbon black (such as Thermax 990 UP® produced by Cancarb), acetylene carbon black (such as AB-100® produced by Chevron), "furnace" type carbon black (such as EN250® produced by MMMCarbon or Printex-85® produced by Degussa), lamp carbon black (such as Lamp101® or Durex-O® produced by Degussa) and carbon black from anthracene.

For this purpose, the content of carbon black may be up to 15% by weight, with respect to the overall weight of the resulting composite material.

The concentrate of the graphite material is mixed with the vinyl aromatic polymer according to the examples described hereunder.

In a first example, a vinyl aromatic monomer is polymerized in any continuous mass process (such as a continuously stirred reactor (CSTR) or plug flow reactor (PFR), with or without catalysts). These processes typically require the use of solvents for reducing the viscosity of the resulting polymer. For example, 5-10% of ethylbenzene is normally added to styrene in the continuous mass production of polystyrene.

Furthermore, the reaction takes place until a conversion of 60-90% is reached. As a result, the reaction is not complete and the viscosity of the partially reacted mixture is well-below the characteristic viscosity of the pure polymer, under the same process conditions. The polymer is recovered in a devolatization unit, where solvent and non-reacted monomers are extracted from the reaction mass.

Advantageously, the concentrate of graphite material is added to the polymer flow before the devolatization unit. Under these conditions, the mixing is effective and does not require high shear rates. The devolatization can be advantageously used under sub-atmospheric pressure.

As a practical example of equipment, it is possible to cite a reactor equipped with a condenser, a flash tank, a stripper, a twin-screw extruder, a thin-layer evaporator.

Preferably, the devolatization is effected at a high temperature (above 200° C.).

In a second example, the concentrate of graphite materials is mixed directly with the vinyl aromatic monomer, before the reaction step. Suspension polymerization is not generally preferred, as the particles of graphite material tend to aggregate following a scheme which is not suitable for obtaining expandable particulates. Vice versa, solution reactors of the continuously stirred type (CSTR) or plug flow type reactors (PFR) are more suitable for this purpose.

In a third example, the graphite material concentrate is injected between a pump which receives the main polymer from the bottom of the devolatilizer and the subsequent cooling step.

In a fourth example, the concentrate of graphite material is injected into the main polymeric stream inside the devolatilization container, in correspondence with the stream of the same leaving the container. Advantageously, the devolatilizer can be kept under vacuum to remove the volatile matter which can be found in the graphite material concentrate.

In a fifth example, the graphite material concentrate is mixed with the expanding agent and subsequently added to the main polymeric stream, after the devolatilization step. The polymeric stream leaving the devolatilizer must be cooled to a temperature not higher than 215° C., preferably not over 200° C., before being mixed with the composition containing the graphite material concentrate.

It can be useful to add part or all of the expanding agent to the concentrate of graphite material before the incorporation of the same in the main polymeric stream. The above is particularly effective when the concentrate of graphite material is a dispersion in a non-hydrophilic solvent. In particular, the mix between the graphite material concentrate, based on petrolatum, and the expanding agents belonging to the group of aliphatic hydrocarbons, can be advantageously injected as a liquid gel into the polymer stream.

Static or dynamic mixers can be used for effecting the mixing of the graphite material concentrate with the main polymer stream.

The expandable granulates can also contain flame retardants in a quantity ranging from 0.5% to 15% by weight, with respect to the weight of the resulting composition. Flame-retardant agents particularly suitable for the expandable vinyl aromatic compositions are aliphatic compounds, cyclo-aliphatic and brominated aromatic compounds, such as hexabromocyclododecane, pentabromomonochlorocyclohexane, tetrabromobisphenol A bis(allyl ether) and pentabromophenyl allyl ether; among the above, hexabromocyclododecane and tetrabromobisphenol A bis(allyl ether) are preferred.

It is possible to enhance the efficacy of the flame-retardant agent by adding any synergetic product known in the art. Non-limiting examples of suitable synergetic products include: dicumylperoxide, cumene hydroperoxide, 3,4-dimethyl-3,4-diphenyl-hexane, 3,4-dimethyl-3-4-diphenyl butane, 3,6,9-triethyl-3,6,9-trimethyl-1,4,7-triperoxynonane.

Other optional additives include plasticizers, hydro-repellents, nucleating agents, antioxidants, bromine stabilizers and smoke-suppressing agents, fillers and lubricants.

All of these additives and those mentioned before can be incorporated in the graphite material concentrate. Alternatively, they can be added and mixed to the concentrate of graphite material before or during the mixing of the resulting composition to the main vinyl aromatic stream.

In the expandable granulates, non-limiting examples of components of the expanding system include liquid hydrocarbons containing from 3 to 6 carbon atoms, halogenated hydrocarbons, water, or carbon dioxide in combination with methanol or ethanol. Among the liquid hydrocarbons mentioned above, butanes, such as n-butane, isobutene and cyclobutane; pentanes such as n-pentane, isopentane, cyclopentane and neopentane; hexanes such as n-hexane, 2-methyl-pentane, 2-ethyl-butane and cyclohexane, can be pointed out. A blend of expanding agents having different boiling points is known to favor expansion. When pentane is used as expanding agent, it is preferable to use a mix of n-pentane and iso-pentane in a weight ratio of 60:40 to 80:20.

The term "expanding system" means an expanding agent when used pure in the expandable polymeric composition, or a blend of expanding agents when more than one are used.

The critical temperature of the expanding system means the critical temperature of the expanding agent, when the expanding system consists of only one expanding agent, or the critical temperature of the expanding agent majority in weight, when the expanding system consists of a blend of expanding agents in which one of the agents is present in the blend by over 50% by weight, or in the other cases, the critical temperature of the blend of expanding agents.

Critical pressure of the expanding system means the critical pressure of the expanding agent, when the expanding system consists of only one expanding agent, or the critical pressure of the expanding agent majority in weight, when the expanding system consists of a blend of expanding agents in which one of the agents is present in the blend by over 50% by weight, or in the other cases, the critical pressure of the blend of expanding agents.

The expanding system is preferably used in a content of 3 to 10 parts by weight, based on 100 parts by weight of the expandable polymeric composition.

The expanding system is added and mixed to the polymeric stream by means of static and/or dynamic mixers. These operations are effected at a polymer temperature ranging from −25 to +25° C., preferably from −15 to +15° C., in comparison with the critical temperature of the expanding system. At the same time, the pressure is maintained above the critical pressure of the expanding system.

The expandable composition can be optionally slightly cooled before the extrusion through the die and subsequent granulation. According to selected literature (see, for example, EP 668,139 or WO 98/51735 and WO 00/43442 and US 2005/0156344) the cooling step is compulsory, or in any case preferable, and it is quite delicate as the temperature at the outlet of the cooler is often a few degrees above the solidification temperature of the molten product.

On the contrary, according to our method, this cooling step is preferably avoided or effected slightly (for example, cooling to a maximum of 60° C. above the glass transition temperature of the vinyl aromatic polymer). Tube-bundle heat exchangers or reagent static mixers (SMR) can be used for this purpose.

Then, the possibly slightly cooled expandable composition is fed to a die head which homogeneously distributes the polymer to the die plate, where the expandable composition is extruded and granulated.

Preferably, the die plate is heated at least to the temperature of the incoming molten polymer, more preferably between 10 and 60° C. above this temperature. The diameters of the die holes are preferably within the range of 0.3 to 1.7 mm, more preferably between 0.4 to 1.2 mm. The length/diameter ratio of the holes is preferably at least 2.5, more preferably from 3 to 10. In relation to the composition, shear rate and temperature of the molten product, the swelling of the expandable polymeric composition varies from 1.2 to 3.0 immediately after the outflow from the die. As a result, by controlling these conditions, it is possible to obtain granulates of expandable composite material having the desired dimension, in particular from 0.6 to 1.8 mm.

The granulator must be set in an underwater mode or "chopped water spray" (according to what is described in US 2005/123638) to prevent the expansion of the expandable composite material during granulation. In both cases, the water temperature is preferably maintained within the range between 20° C. and the glass transition temperature (Tg) of the expandable polymeric composition plus 15° C. Furthermore, the granulation chamber should be kept pressurized, preferably from 1.5 to about 20 barg, more preferably between 3 and 7 barg.

When chopped water spray granulation is used, a gas flow is required in the granulation chamber. This gas flow must be controlled to prevent the flooding of the chamber and, at the same time, the interruption or deviation of the liquid flow coming out of the spray. Preferably, this gas is nitrogen.

A uniform distribution of the liquid is required against the die to ensure a high-quality granulation. The preferred liquid flow is water. Following the Examples and Comparative Examples, Table 4 reports some typical operative ranges for the nitrogen and water flows.

Figure 4:
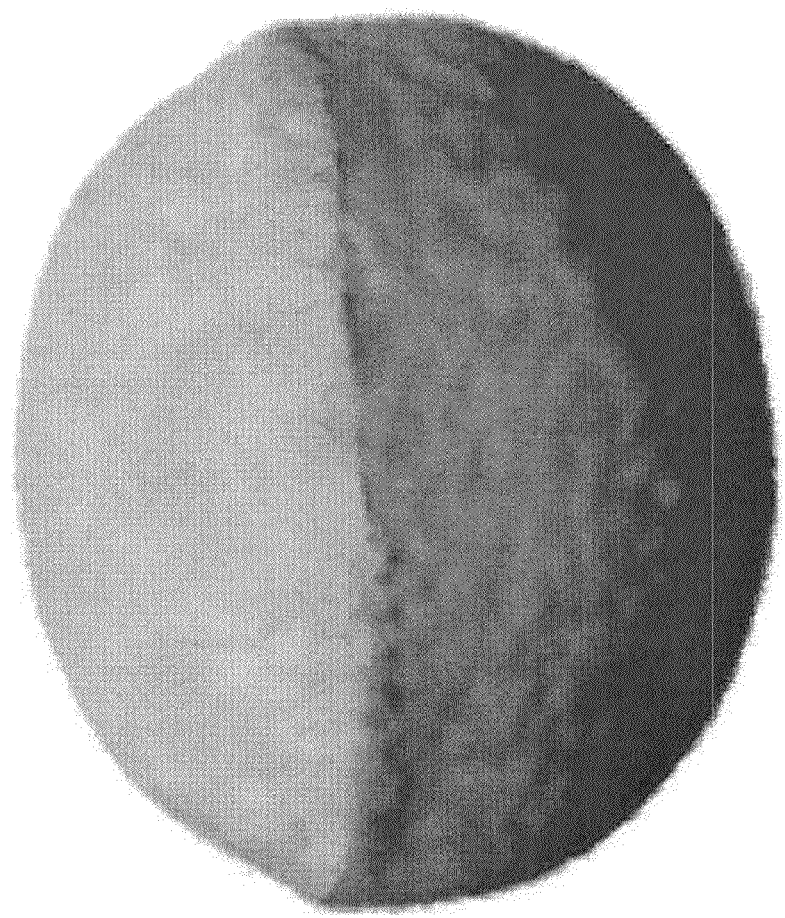
FIG. 4 is an image taken with an optical microscope of a particulate expandable composite.

Under the following conditions, composite expandable particulates are obtained, which are either characterized by an essentially ellipsoidal shape, or, more specifically, by a shape of a walnut characterized by a particular annular indentation (see FIG. 4). It is possible to quantitatively characterize this shape by means of a shape factor. Many definitions of the same can be found in literature (see, for example, Sukumaran, B. and Ashmawy A. K. (2001) "Quantitative characterization of the Geometry of Discrete Particles," Geotechnique, vol. 51, nr. 7, September, pages 619-627). The following adimensional definition of the shape factor is used herein:

$$SF = 36 \cdot \pi \cdot (V^2/A^3)$$

wherein V is the volume of the expandable composite particle and A the area of the corresponding surface. The shape factor SF is equal to 1 for a perfect sphere and decreases with an increase in the anisotropy, approaching zero for cylinders having a length/diameter ratio which approaches infinity.

Expandable composite particulates are obtained with a shape factor SF, as defined above, typically ranging from 0.60 to 0.99.

Preferably, this shape factor ranges from 0.70 to 0.98. Increasing shape factors are obtained by increasing the polymer temperature and decreasing water cooling (for example, by diminishing the flow).

Surprisingly, the composite particulates normally show an excellent expandability and moldability when transformed according to the standard methods in use. Table 5 reports various results obtained by the transformation of expandable composite particulates taken from the Examples and from the Comparative Examples. It can be seen that the products obtained have a higher expansion rate if compared with similar products having the same content of expanding system. This effect is particularly evident during the first minute of expansion. After 24 hrs of rest, the composite beads can be expanded again. As a result of the second expansion, very low densities can be obtained, or, in any case, lower than the corresponding values of the Comparative Examples.

To reach the desired distribution, the particles of graphite material typically have to be maintained in the molten polymeric composition for a residence time equal to or higher than 2 minutes, preferably from 7 to 60 minutes. Generally, this residence time includes the time required by the graphite material to pass through all the units included between the addition of the same in the polymeric stream and the granulation of the resulting expandable composite material.

The coefficient of variation (COV) of the graphite material in the resin was evaluated to characterize the particle distribution of graphite material in the resulting expandable composition.

The coefficient of variation (COV) is an adimensional ratio resulting from the division of the standard deviation of a measured amount, with respect to its average:

$$CoV = \frac{1}{\overline{x}} \cdot \sqrt{\frac{\sum_{i=1}^{N}(x_i - \overline{x})^2}{N-1}}$$

$$\overline{x} = \frac{1}{N} \cdot \sum_{i=1}^{N} x_i$$

wherein N is the number of samples, x the amount measured and $\overline{x}$ its average in number.

References on the calculation of the COV can be found in U.S. Pat. No. 5,795,364 and U.S. Pat. No. 6,897,014.

The measured amount "x" is the concentration of the graphite material in the resin and is obtained by sampling photographs of slices of expandable composite materials, by means of an optical microscope. The digital images have a pixel resolution of 333 nm and an area A of about 30,000 μm². The samples are obtained by dividing this area into a number N of regions of equal areas with $A_N = A/N$ and by computing the average concentration $x_i$ in each region.

For N approaching 2 the computed COV approaches 0 whereas when N tends to infinitive, the following is obtained:

$$CoV_0 = \sqrt{\frac{1-\overline{x}}{\overline{x}}}.$$

Advantageously, is to represent the mixing degree as the COV ratio (see, for example, U.S. Pat. No. 5,597,236 or "Laminar Flow in Static Mixers with Helical Elements," A. Bakker, R. D. LaRoche, E. M. Marshall, The Online CFM Book, 1998):

$$H(N) = \frac{CoV(N)}{CoV_0}$$

so that H(N) is limited between 0 (complete homogeneity) and 1 (complete segregation), regardless of the content of graphite material.

To impress the areas of graphite material, the image is subjected to a cleaning pre-treatment, which consists of a filtering obtained by discrete cosine transform (DCT) of the image; zeroing of the first coefficient; reconstruction of the image by means of the inverse transform (IDCT). Only the grey tones ranging from 10% of the cumulative histogram of the image and 30% of the same are considered.

The mixing diagram obtained by plotting H(N) as a function of the areas of the regions $A_N(N)$ provides useful information about the morphology of the aggregates of graphite material.

In particular, the value $A_c = A_N(N_c)$ of the area of the regions $A_N(N)$ for which results $H(N_c) = \frac{1}{3}$, is an index of the dispersion degree of the graphite material. Statistically, the samples having an area larger than this value $A_c$ have a variance in the content of graphite material equal to or lower than a fixed value. Hereafter, the parameter $A_c$ will be referred to "minimal mixing area" (MMA).

Methodologically, the minimal mixing area is calculated by "spline" interpolation of the data of the region area $A_N(N)$ plotted versus H(N).

Typically, the particulates show a minimal mixing area of between 35 and 3,000 μm², more typically between 45 and 1,000 μm².

The thermal conductivity of the expanded manufactured products was measured according to the regulation EN 13163T.

This test evaluates the overall thermal conductivity under the specified test conditions but does not provide a direct measurement of the capacity of blocking the infrared rays. It is difficult to evaluate the thermal insulation performances only from the information on the overall thermal conductivity. In fact, the same thermal conductivity strongly depends on the density of the test samples, this characteristic, however, is difficult to repeat.

A better approach is the direct evaluation of the capacity of the additives to block infrared radiations. These data can be obtained by both direct measurement of the light transmitted by an infrared laser through the sample (see, for example, WO 06/073712, Table 5), and also by an indirect computation effected on the results of the conductivity tests carried out according to the regulation EN 13163T.

The thermal conductivity data obtained from this test include three contributions (infrared radiation, polymer conduction and gas conduction). To appreciate the effect of the capacity of blocking the infrared of the graphite materials, it is necessary to remove the contribution of the air and polymer conduction from the total thermal conductivity to result in the contribution of the infrared radiation alone:

$$k_{RADIATIVE} = k_{TOT} - (k_{AIR} + k_{POLYMER})$$

$$k_{POLYMER} = 170[mW/mK] \cdot \frac{2}{3} \cdot \rho_{FOAM}/\rho_{POLYMER}$$

$$k_{AIR} = 26.5[mW/mK] \cdot (1 \rho_{FOAM}/\rho_{POLYMER})$$

wherein $\rho_{FOAM}$ is the foam density and $\rho_{POLYMER}$ the density of the compact polymer.

It is useful to normalize the radiative contribution with respect to the conductivity. In fact, in the above-mentioned conductivity test, the test sample to be evaluated is enclosed between two radiant surfaces; when the density of the test sample approaches zero, the quantity of expanded material is also reduced, as also the interaction between this and the radiative stream. Therefore, under this condition, the radiative contribution to the conductivity must be equal to the value $k_{MAX}$ resulting from the radiation of the grey body between the two confining walls forming the measurement chamber. This value only depends on the operative conditions of the thermo-fluxmeter and not on the material tested, and can be calculated.

Surprisingly, it has been discovered that the radiative contribution $k_{RADIATIVE}$ can be correlated with the density of the foam.

More specifically, the logarithm of the radiative contribution is substantially linear with respect to the density of the expanded material on a wide density range, as can be deduced from FIG. 1.

This result suggests the applicability of a generalized form of the Lambert-Beer law for the optical absorption:

$$k_{RADIATIVE} = k_{MAX} \cdot e^{-\sigma\left(\frac{\rho_{FOAM}}{\rho_{POLYMER}}+c\right)\Delta Z}$$

wherein $\Delta Z$ is the test sample thickness, $\sigma$ is the material capture cross section and $c$ is a constant.

Within certain limits, the capture cross section can be expressed as the sum of the contribution of the polymer and other additives which block the infrared radiation:

$$\sigma = x_{POLYMER} \cdot \sigma_{POLYMER} + \sum_{i=1}^{N} x_i \cdot \sigma_i$$

wherein $x_{POLYMER}$ is the fraction of the polymer in the composite material, and $x_i$ the (optional) fractions of additives which block the infrared radiation.

As the capture cross section is independent of the foam density (it depends exclusively on the composite material and not on the expansion conditions), it is possible to analyze the efficacy of the composite materials regardless of the transformation conditions. The analysis is used in the Examples and Comparative Examples described herein to show the improved thermal insulation performances and blocking capacity of the infrared radiation.

Some illustrative and non-limiting examples are provided below for better understanding.

EXAMPLES

Examples 1a to 1f describe different methods and formulations for the production of concentrates of graphite materials;

Examples 2, 3, 4 and 6 illustrate various preparation methods of the expandable vinyl aromatic polymer beads;

Examples 2 to 10 relate to the use of concentrates of graphite material obtained according to Example 1e;

Examples 11 to 15 relate to the use of the concentrates of graphite material obtained according to Example 1d;

Examples 16 to 24 relate to the use of other concentrates of graphite material or different process conditions;

the comparative examples refer to EPS beads obtained according to the known art.

Example 1a 80 parts of colloidal GP460 graphite, based on a blend of hydrocarbons known as "Petrolatum," sold by Acheson (concentration of graphite material: 50% by weight); 5 parts of stearic acid produced by Henan Jiujiu Chemical Co. Ltd; 5 parts of zinc stearate produced by Reagens Ltd; 5 parts of talc Minstron 002 produced by Luzenac; 5 parts of ethylene-bis-stereamide are fed to a continuous screw mixer which homogenizes the composition for an average residence time of 5 minutes.

The composition thus obtained (concentration of the graphite material: 40% by weight) is extracted from the screw by means of a progressive cavity pump and used as a concentrate of graphite material for the production of expandable particle composites.

Example 1b

The aqueous-based colloidal graphite E-LB 2000 RD053 of Timcal (graphite concentration 25% by weight) is subjected to a stream of overheated steam in a stirred container at atmospheric pressure, until the graphite concentration has increased to 50%.

80 parts of the resulting graphite material colloid; 8 parts of Minstron talc 002 of Luzenac; 4 parts of hydrotalcite DHT-4A of Kyowa Chemical Industry Co.; 2.5 parts of glyceryl-monostearate; 0.5 parts of polyoxyethylene (2O) sorbitan-monolaurate, Tween-20 Of ICI America; and 5 parts of ethylene-bis-stearamide are fed to a continuous screw mixer which mixes the composition for an average residence time of 5 minutes.

The resulting composition can be used as a concentrate of graphite material in the production of expandable composites.

Example 1c

The natural graphite MetalPure 8595 produced by Superior Graphite is treated at 100° C. for 20 minutes with a mixture consisting of 90 parts of a solution of sulphuric acid at 96 percent and 10 parts of a solution of nitric acid at 67 percent. The graphite thus intercalated is washed with water, dried for 2 hours at 90° C. and finally fed to a furnace where it is subjected to a temperature of 820° C. for 40 seconds.

A base composition is prepared in a dry mixer by mixing 68 parts of polystyrene N2982 produced by Polimeri Europa in granules (Mw=130,000 g/mol, Mw/Mn=2.3 MFI (200° C., 5 kg)=25 g/10') and 2 parts of a solvent based on dipentene (Histolemon Erba, produced by Carlo Erba Reagenti). 25 parts of the graphite thus treated and 5 parts of "Lamp Black Durex-O," produced by Degussa, are mixed in a twin-screw extruder together with the previously prepared base composition.

The resulting composition is used as a concentrate of graphite material in the production of expandable particle composites.

Example 1d 70 parts of polystyrene N2982, 4 parts of ethylene-bis-stereamide, 1 part of dioctyl terephthalate (Eastman 168) and 25 parts of graphite UF2-96/97 produced by Kropfmuhl are mixed in a twin-screw extruder.

The product can be used directly in the molten state, as a concentrate of graphite material in the production of expandable particle composites. Alternatively, it can be granulated into particles, suitably stored and used subsequently for the same purposes.

Example 1e 70 parts of polystyrene N2982, 4 parts of ethylene-bis-stereamide, 1 part of dioctyl terephthalate (Eastman 168), 2 parts of carbon black "Lamp Black Durex-O," produced by Degussa, and 23 parts of graphite MetalPURE 5595 produced by Superior Graphite are mixed in a twin-screw extruder. The extruded product can be used as a concentrate of graphite material in the production of the expandable composites.

Example 1f

A base composition is prepared in a dry mixer by mixing 60 parts of polystyrene N2982 and 1 part of hydrogenated ricin oil (THIXCIN R produced by Kionos Titan).

Carbon coke PC40 produced by Timcal starting from crude oil is pulverized in a jet mill to obtain a powder with an average d50 size (measured by laser diffraction) of 4 microns.

25 parts of pulverized coke thus produced; 5 parts of ethylene-bis-stearamide; 9 parts of "furnace" type carbon black EN250, produced by MMM Carbon, are mixed in a twin-screw extruder together with the base composition previously prepared.

The extruded product can be used as a concentrate of graphite material in the production of the expandable composites.

Example 1g 60 parts of linear low density polyethylene Flexirene FG 30 type produced by Polimeri Europa (density 0.925 g/l, MFI (190°, 2.16 kg) equal to 1.0 g/10'); and 40 parts of graphite MetalPURE 5595 produced by Superior Graphite, are mixed in a twin-screw extruder. The product can be used, directly in the molten state, as a concentrate of graphite material in the production of expandable particle composites. Alternatively, it can be granulated into particles, suitably stored and used subsequently for the same purposes.

Example 1h 60 parts of low density polyethylene of the Riblene FC 30 type, produced by Polimeri Europa (density 0.922 g/l, MFI (190°, 2.16 kg) equal to 0.27 g/10'); and 40 parts of MetalPURE 5595 graphite produced by Superior Graphite, are mixed in a twin-screw extruder. The product can be used, directly in the molten state, as a concentrate of graphite material in the production of expandable particle composites. Alternatively, it can be granulated into particles, suitably stored and used subsequently for the same purposes.

Example 1i 60 parts of medium density polyethylene of the Eraclene FB 506 type, produced by Polimeri Europa (density 0.939 g/l, MFI (190°, 5 kg) equal to 0.8 g/10'); and 40 parts of MetalPURE 5595 graphite produced by Superior Graphite, are mixed in a twin-screw extruder. The product can be used, directly in the molten state, as a concentrate of graphite material in the production of expandable particle composites. Alternatively, it can be granulated into particles, suitably stored and used subsequently for the same purposes.

Example 2

89.8 parts of ethylbenzene, 730.0 parts of styrene, 56.2 parts of α-methylstyrene, 0.2 parts of divinylbenzene are fed into a stirred reactor.

123.8 parts of the concentrate prepared according to Example 1e are fed to a reactor and dissolved (total: 1,000 parts). The reaction is carried out at 125° C. with an average residence time of 2 hours. The fluid composition at the outlet is then fed to a second reactor where the reaction is completed at 135° C. with an average residence time of 2 hours.

The reactive polymeric composition, having a conversion of 72%, is heated to 240° C. and subsequently fed to a devolatilizer to remove the solvent and the residual monomer. The resulting composition has a glass transition temperature of 104° C., a melt flow index (MFI 200° C., 5 kg) of 8 g/10', a molecular weight Mw of 200,000 g/mol and a Mw/Mn ratio of 2.8, wherein Mw is the weight average molecular weight and Mn is the number average molecular weight.

The vinyl aromatic composition is collected in a heated tank and fed to a heat exchanger to lower its temperature to 190° C.

120.7 parts of polystyrene N2982, 24.2 parts of BR-E 5300 (stabilized hexabromocyclododecane, sold by Chemtura) and 5.1 parts of Perkadox 30® (2,3-dimethyl-2,3-diphenyl butane, sold by Akzo Nobel) (total: 150 parts) are fed to a twin-screw extruder. A gear pump increases the feeding pressure of the molten additive to 260 barg. 47 parts of a mixture of n-pentane (75%) and iso-pentane (25%) are then pressurized and injected into the additive feed. Mixing is completed by means of static mixers, at a temperature of about 190° C.

The so mixed composition is added to 850 parts of the vinyl aromatic stream coming from the heat exchanger. The ingredients are then mixed by means of static mixing elements for a calculated average (residence) time of 7 minutes. The composition is then distributed to the die, where it is extruded through a number of holes having a diameter of 0.5 mm, immediately cooled by a water jet and cut by means of a series of rotating knives (according to US 2005/0123638). The granulation pressure is 5 barg and the shear rate is selected to obtain granulates having an average-diameter of 1.2 mm. Water is used as spray liquid and nitrogen as carrier gas. The ratio between the water spray and the polymeric mass flow-rate is 30 and that between the nitrogen and the polymeric mass is 20. The water temperature is 40° C.

The resulting granulated beads are dried by means of a centrifuge drier and then covered with a coating. The coating is prepared by adding to the beads 3 parts of glyceryl monostearate, 1 part of zinc stearate and 0.2 parts of glycerine for 1,000 parts of granulated and dried beads. The coating additives are mixed with the granulate by means of a continuous screw mixer.

The granulated beads covered by the coating are expanded by means of steam in a stirred pre-expander at atmospheric pressure. When the desired density is reached, the flow of steam is interrupted and the beads are dried by means of an air flow. After a rest of 24 hours, the expanded beads are put in a mold and treated with steam to obtain the desired manufactured products.

The thermal conductivity and fire test are evaluated on the manufactured products thus obtained.

The actual content of graphite material is measured by means of thermogravimetric analysis (TGA).

The optical images of the distribution of the graphite material were obtained by means of an optical microscope and the mixing quality H was calculated according to the equations provided herein.

Example 3

89.8 parts of ethylbenzene, 730 parts of styrene, 56.2 parts of α-methylstyrene, 0.2 parts of divinylbenzene (total: 876.2 parts), are fed to a stirred reactor and subjected to the same reaction conditions of Example 2.

123.8 parts of the concentrate obtained according to Example 1e are added, in the molten state, to 876.2 parts of the vinyl aromatic reaction mixture at the outlet from the second reactor (total=1,000 parts), and mixed by means of a static mixer. The resulting vinyl aromatic mixture, leaving the devolatilizer, is cooled, mixed with pentane and other additives, granulated, dried, coating additives are added, expanded and molded as in Example 2.

The thermal conductivity, the fire test, the micrographs and the actual content of the graphite material are measured according to what is described in Example 2.

Example 4

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as described in Example 2.

38.2 parts of polystyrene N2982, 24.2 parts of BR-E 5300, 5.1 parts of Perkadox 30® and 152.5 parts of the concentrate obtained as in Example 1e are fed into a twin-screw extruder. A gear pump increases the pressure of the additive stream in the molten state to 260 barg. 47 parts of a mixture of n-pentane (75%) and iso-pentane (25%) are pressurized and injected into the additive stream (total: 267 parts).

The mixture is prepared by means of static mixers, at a temperature of about 190° C.

The resulting additive stream (267 parts) is added to 733 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is in described in Example 2.

Example 5

90 parts of ethylbenzene, 844.6 parts of styrene, 65.2 parts of α-methylstyrene, 0.2 parts of divinylbenzene (total: 1,000 parts), are fed to a reactor, under stirring. The mixture is subjected to the same reaction processes, devolatilization and cooling and operating conditions as indicated in Example 2.

38.6 parts of polystyrene N2982, 10.0 parts of BR-E 5300, 1.9 parts of Perkadox 30® and 152.5 parts of the concentrate obtained as in Example 1e are fed into a twin-screw extruder. A gear pump increases the pressure of the additive stream in the molten state to 260 barg. 47 parts of a mixture of n-pentane (75%) and iso-pentane (25%) are pressurized and injected into the additive stream (total: 250 parts).

The mixture is prepared by means of static mixers, at a temperature of about 190° C.

The resulting additive stream (250 parts) is added to 750 parts of a vinyl aromatic mixture coming from the heat exchanger (total: 1,000 parts).

The ingredients are then mixed by means of static mixing elements for a calculated average (residence) time of 11 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 6

Granules of polystyrene N1782 (polystyrene having a Mw equal to 180,000 g/mol, Mw/Mn=2.3, MFI (200° C., 5 kg) equal to 8 g/10', produced by Polimeri Europa) are fed into a first extruder. The molten polystyrene is then pressurized at 250 barg by means of a gear pump, and cooled to 190° C. by means of a heat exchanger.

38.2 parts of polystyrene N2982, 24.2 parts of BR-E 5300, 5.1 parts of Perkadox 30 and 152.5 parts of the concentrate obtained in Example 1e are fed into a second extruder, of the twin-screw type. A gear pump increases the pressure of the molten additive stream to 260 barg. 47 parts of a mixture of n-pentane (75%) and iso-pentane (25%) are pressurized and injected into the additive stream (total: 267 parts).

The mixing is effected by means of static mixers, at a temperature of about 190° C., for a total residence time in the mixer of about 2 minutes.

The resulting additive stream (267 parts) is added to 733 parts of a vinyl aromatic mixture coming from the heat exchanger (total: 1,000 parts).

The ingredients are then mixed by means of static mixing elements for a calculated average (residence) time of 15 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 7

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as indicated in Example 2.

38.1 parts of polystyrene N2982, 24.2 parts of BR-E 5300, 5.1 parts of Perkadox 30° and 190.6 parts of the concentrate obtained as in Example 1e are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 305 parts).

The mixture is prepared by means of static mixers, at a temperature of about 190° C. for a total residence time in mixing of about 2 minutes.

The resulting additive stream (305 parts) is added to 695 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 8

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction conditions, devolatilization and cooling and operating process as indicated in Example 2.

42.6 parts of polystyrene N2982, 17.2 parts of BR-E 5300, 3.8 parts of Perkadox 30® and 114.4 parts of the concentrate obtained as in Example 1e are fed into a twin-screw extruder.

A gear pump increases the pressure of the additive stream in the molten state, to 260 barg. 47 parts of a mixture of n-pentane (75%) and iso-pentane (25%) are pressurized and injected into the additive stream (total: 225 parts).

The mixture is prepared by means of static mixers, at a temperature of about 190° C. for a total residence time in mixing of about 2 minutes.

The resulting additive stream (225 parts) is added to 775 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 9

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as described in Example 2.

56.3 parts of polystyrene N2982, 12.8 parts of BR-E 5300, 2.9 parts of Perkadox 30° and 61.0 parts of the concentrate obtained as in Example 1e are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 180 parts).

The mixture is prepared by means of static mixers, at a temperature of about 190° C. for a total residence time in mixing of about 2 minutes.

The resulting additive stream (180 parts) is added to 820 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 10

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operative conditions as indicated in Example 2.

17.3 parts of polystyrene N2982, 32.1 parts of BR-E 5300, 5.6 parts of Perkadox 30® and 228.0 parts of the concentrate obtained as in Example 1e are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 330 parts).

The mixture is prepared by means of static mixers, at a temperature of about 190° C. during a total residence time in mixing of about 2 minutes.

The resulting additive stream (330 parts) is added to 670 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 11

Example 10 is repeated, but replacing the 228.0 parts of the concentrate obtained according to Example 1e, with an equal amount of master batch obtained according to Example 1d.

Example 12

Example 4 is repeated, but replacing the 152.5 parts of the concentrate obtained according to Example 1e, with an equal amount of master batch obtained according to Example 1d.

Example 13

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as indicated in Example 2.

122.5 parts of polystyrene N2982, 9.5 parts of BR-E 5300, 1.9 parts of Perkadox 30® and 19.1 parts of the concentrate obtained as in Example 1d, are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 200 parts).

The mixture is prepared by means of static mixers, at a temperature of about 190° C. for a total residence time in mixing of about 2 minutes.

The resulting additive stream (200 parts) is added to 800 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 14

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as indicated in Example 2.

18.7 parts of polystyrene N2982, 24.2 parts of BR-E 5300, 5.1 parts of Perkadox 30® and 305 parts of the concentrate obtained as in Example 1d, are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 400 parts).

The mixture is prepared by means of static mixers, at a temperature of about 190° C. during a total residence time in mixing of about 2 minutes.

The resulting additive stream (400 parts) is added to 600 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 15

Example 8 is repeated, but replacing the 114.4 parts of the concentrate of graphite material obtained according to Example 1e, with an equal amount of the concentrate of graphite material obtained according to Example 1b.

Example 16

Example 8 is repeated, but replacing the 114.4 parts of the concentrate of graphite material obtained according to Example 1e, with an equal amount of the concentrate of graphite material obtained according to Example 1c.

Example 17

Example 8 is repeated, but replacing the 114.4 parts of the concentrate of graphite material obtained according to Example 1e, with an equal amount of the concentrate of graphite material obtained according to Example 1f.

Example 18

Example 8 is repeated, but replacing the 114.4 parts of the concentrate of graphite material obtained according to Example 1e, with an equal amount of the concentrate of graphite material obtained according to Example 1a.

Example 19

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as indicated in Example 2.

144.95 parts of polystyrene having a Mw equal to 130,000 g/mol, Mw/Mn=2.3, MFI (200° C., 5 kg)=25 g/10'; 6.1 parts of ethylene-bis-stereamide, 1.5 parts of dioctyl-terephthalate (Eastman 168), 3.05 parts of Lamp Black Durex-0 produced by Degussa, 35.1 parts of graphite MetalPURE 5595 produced by Superior Graphite, 24.2 parts of BR-E 5300 and 5.1 parts of Perkadox 30, are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 267 parts).

The mixture is prepared by means of static mixers, at a temperature of about 190° C. for a total residence time in mixing of about 2 minutes.

The resulting additive stream (267 parts) is added to 733 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coating is added, expanded, and molded according to Example 2.

The thermal conductivity, the fire test, the micrographs and actual content of the graphite material are measured according to what is described in Example 2.

Example 20

Example 4 is repeated, but replacing the 152.5 parts of the concentrate obtained according to Example 1e, with 57.2 parts of polystyrene N2982 plus 95.3 parts of the concentrate obtained according to Example 1g.

Example 21

Example 4 is repeated, but replacing the 152.5 parts of the concentrate obtained according to Example 1e, with 57.2 parts of polystyrene N2982 plus 95.3 parts of the master batch obtained according to Example 1h.

Example 22

Example 4 is repeated, but replacing the 152.5 parts of the concentrate obtained according to Example 1e, with 57.2 parts of polystyrene N2982 plus 95.3 parts of the concentrate obtained according to Example 11.

Example 23

Example 6 is repeated, but replacing the polystyrene N1782 fed to the first reactor, with an equal amount of high impact polystyrene of the type Edistir® ICE R 830D in granules (having a MFI (200° C., 5 kg) equal to 3 g/10', produced by Polimeri Europa); and replacing the 152.5 parts of the concentrate obtained according to Example 1e, with 57.2 parts of polystyrene N2982, plus 95.3 parts of the concentrate obtained according to Example 11.

Example 24

90 parts of ethylbenzene, 879.3 parts of styrene, 65.2 parts of α-methylstyrene, 0.2 parts of divinylbenzene (total: 1,000 part) are fed to a reactor under stirring. The mixture is subjected to the same reaction processes, devolatilization and cooling under the same operating conditions as indicated in Example 2.

46.7 parts of low density polyethylene of the Riblene FC 30 type produced by Polimeri Europa (density 0.922 g/l, MFI (190° C., 2.16 kg) equal to 0.27 g/10'); and 57.2 parts of graphite MetalPURE 5595 produced by Superior Graphite, are fed and mixed in a twin-screw extruder. A gear pump increases the pressure of the additive stream in the molten state, to 260 barg.

The resulting additive stream (138.6 parts) is added to 861.4 parts of the vinyl aromatic mixture coming from the heat exchanger and 47 parts of a mixture of n-pentane (75%) and iso-pentane (25%) for a total of 1,000 parts.

The ingredients are then mixed and granulated according to Example 2. The granulates are dried, coated is added, and then expanded and molded, according to Example 2.

Comparative Example 1a 70 parts of polystyrene having a Mw=130,000 g/mol, Mw/Mn=2.3, MFI (200° C., 5 kg)=25 g/10'; 4 parts of ethylene-bis-stearamide, 1 part of dioctyl terephthalate (Eastman 168) and 25 parts of carbon black of the "thermal type" (Thermax 990 UP produced by CanCarb) are mixed in a twin-screw extruder. The molten product leaving the extruder is cooled and granulated and is subsequently used as a concentrate in the following comparative examples.

Comparative Example 1b 70 parts of polystyrene having a Mw=130,000 g/mol, Mw/Mn=2.3, MFI (200° C., 5 kg)=25 g/10'; 4 parts of ethylene-bis-stearamide, 1 part of dioctyl terephthalate (Eastman 168) and 25 parts of "furnace" type carbon black (Printex-85 produced by Degussa) are mixed in a twin-screw extruder. The molten product leaving the extruder is cooled and granulated and is subsequently used as a concentrate in the following comparative examples.

Comparative Example 1c 70 parts of polystyrene having a Mw=280,000 g/mol, Mw/Mn=2.3, MFI (200° C., 5 kg)=2 g/10'; 4 parts of ethylene-bis-stearamide, 1 part of dioctyl terephthalate (Eastman 168) and 25 parts MetalPURE 5595 graphite produced by Superior Graphite, are mixed in a twin-screw extruder. The molten product leaving the extruder is cooled and granulated and is subsequently used as a concentrate in the following comparative examples.

Comparative Example 2

90 parts of ethylbenzene, 844.6 parts of styrene, 65.2 parts of α-methylstyrene, 0.2 parts of divinylbenzene (total: 1,000 parts), are fed to a reactor under stirring. The mixture is subjected to the same reaction processes, devolatilization and cooling and operating conditions as indicated in Example 2.

143.5 parts of polystyrene N2982, 7.6 parts of Br-E 5300, 1.9 parts of Perkadox 30, are fed into a twin-screw extruder. A gear pump increases the pressure of the additive stream in the molten state, to 260 barg. 47 parts of a mixture of n-pentane (75%) and iso-pentane (25%) are pressurized and injected into the additive stream (total: 200 parts).

The mixture is prepared by means of static mixers, at a temperature of about 190° C. for a total residence time in mixing of about 2 minutes.

The resulting additive stream (200 parts) is added to 800 parts of a vinyl aromatic mixture coming from the heat exchanger (total: 1,000 parts).

The ingredients are then mixed by means of static mixing elements for a calculated average (residence) time of 7 minutes.

The mixture is then distributed on the die, granulated, dried, coated, expanded, and molded according to Example 2.

The thermal conductivity, the fire test, the microscope images are measured as indicated in the previous examples.

Comparative Example 3

160.0 parts of master batch obtained from Example 1e, 25.0 parts of hexabromocyclododecane, 5.0 parts of dicumylperoxide, 1.0 parts of dibenzoylperoxide, 3 parts of tert-butyl-peroxy-2-ethyl hexanoate and 4 parts of tert-butylperoxide-2-ethylhexyl hexanoate in 802.0 parts of styrene (total: 1,000 parts), are dissolved in a first stirred reactor.

0.7 parts of sodium pyrophosphate and 1.3 parts of magnesium sulphate are dissolved in 548 parts of deionized water in a second stirred reactor, then 450 parts of the organic phase are transferred from the first to the second reactor (total: 1,000 parts). The suspension is heated to 110° C. for two hours. 47 parts of a 75:25 mixture of n-pentane and iso-pentane are then dosed and the reactor is heated to 134° C. for one hour to complete the polymerization. The expandable beads are separated from the aqueous phase, dried, sieved to remove the fractions having a diameter smaller then 0.8 mm and larger than 1.6 mm. After the addition of the coating, the beads are expanded and molded following Example 2.

The thermal conductivity data, fire test, images at the microscope and actual content of graphite material, are measured as described in the previous examples.

Comparative Example 4

929.2 parts of polystyrene N1782 (having a Mw equal to 180,000 g/mol, Mw/Mn equal to 2.3, MFI (200° C., 5 kg) equal to 8 g/10', produced by Polimeri Europa), 25.4 parts of BR-E-5300, 5.4 parts of Perkadox 30 and 40 parts of graphite UF-96/97 produced by Kropfmuhl (total: 1000 parts), are fed into a twin-screw extruder. 50 parts of a mixture of n-pentane (75%) and iso-pentane (25%) are dosed in a side inlet of the extruder at a temperature of the molten product of about 160° C. and mixed therein with the main polymeric stream by means of a series of mixing elements assembled on the extruder screw.

The composition is then distributed on the die, wherein is extruded through a number of holes having a diameter equal to 0.5 mm and cut by a rotating set of knives in a granulator of the "underwater" type. The granulator pressure is 5 barg and the shear rate is selected to obtain a particulate having an average diameter of 1.2 mm.

The composition is then dried, the coated, expanded and molded as in Example 2. The thermal conductivity, the fire test, micrographs and actual content of the graphite material are measured as described in the previous examples.

Comparative Example 5a

A polymeric molten mixture containing 974.8 parts of polystyrene (with a molecular weight Mw equal to 220,000 g/mol), 21 parts of hexabromocyclododecane and 4.2 parts of isopropylbenzene peroxide (total: 1,000 parts) is fed into a twin-screw extruder.

40 parts of graphite UF2-96/97, produced by Kropfmuhl, and 50 parts of a mixture of n-pentane (805) and isopentane (20%) are dosed in the polymer at a temperature of the molten product of about 160° C.

The resulting composition is passed, at a melting temperature of about 180° C., through a die and granulated therein by means of an "underwater"-type granulator.

The granulator pressure is 5 barg and the shear rate is suitably selected to obtain a pseudo-spherical particulate having an average diameter of 1.4 mm.

The composition is then dried, coated, then expanded and molded, as described in Example 2. The thermal conductivity, the fire test, micrographs and actual content of the graphite material are measured as described in the previous examples.

Comparative Example 5b

Comparative Example 5a is repeated with the same procedure and formulation, but with a graphite content reduced to 20 parts.

Comparative Example 5c

Comparative Example 5a is repeated with the same procedure and formulation, but with a graphite content reduced to 10 parts.

Comparative Example 6a

Comparative Example 3 is repeated with the same procedure and formulation, but 902 parts of styrene are fed into the first stirred reactor together with 60 parts of graphite UF2-96/97, produced by Kropfmuhl, instead of the concentrate of Example 1e.

Comparative Example 6b

Comparative Example 3 is repeated with the same procedure and formulation, but 932 parts of styrene are fed into the first stirred reactor together with 30 parts of graphite UF2-96/97, produced by Kropfmuhl, instead of the concentrate of Example 1e.

Comparative Example 6c

Comparative Example 3 is repeated with the same procedure and formulation, but 942 parts of styrene are fed into the first stirred reactor together with 20 parts of graphite UF2-96/97, produced by Kropfmuhl, instead of the concentrate of Example 1e.

Comparative Example 6d

Comparative Example 3 is repeated with the same procedure and formulation, but 952 parts of styrene are fed into the first stirred reactor together with 10 parts of graphite UF2-96/97, produced by Kropfmuhl, instead of the concentrate of Example 1e.

Comparative Example 6e

Comparative Example 3 is repeated with the same procedure and formulation, but 957 parts of styrene are fed into the first stirred reactor together with 5 parts of graphite UF2-96/97, produced by Kropfmuhl, instead of the concentrate of Example 1e.

Comparative Example 7a

Example 8 is repeated, replacing the 114.4 parts of graphite material concentrate obtained as in Example 1e with the same amount of graphite material concentrate, obtained according to Comparative Example 1a.

Comparative Example 7b

Example 8 is repeated, replacing the 114.4 parts of graphite material concentrate obtained as in Example 1e with the same amount of graphite material concentrate, obtained according to Comparative Example 1b.

Comparative Example 7c

Example 8 is repeated, replacing the 114.4 parts of graphite material concentrate obtained as in Example 1e with the same amount of graphite material concentrate, obtained according to Comparative Example 1c.

Analysis of the Examples and Comparative Examples

FIGS. 2a to 2h show the optical microscope images of thin layers of some particulate expandable compositions at certain magnifications and, when possible, the relative mixing diagrams. In the photo, the graphite material is black and the matrix is white.

Figure 2H:
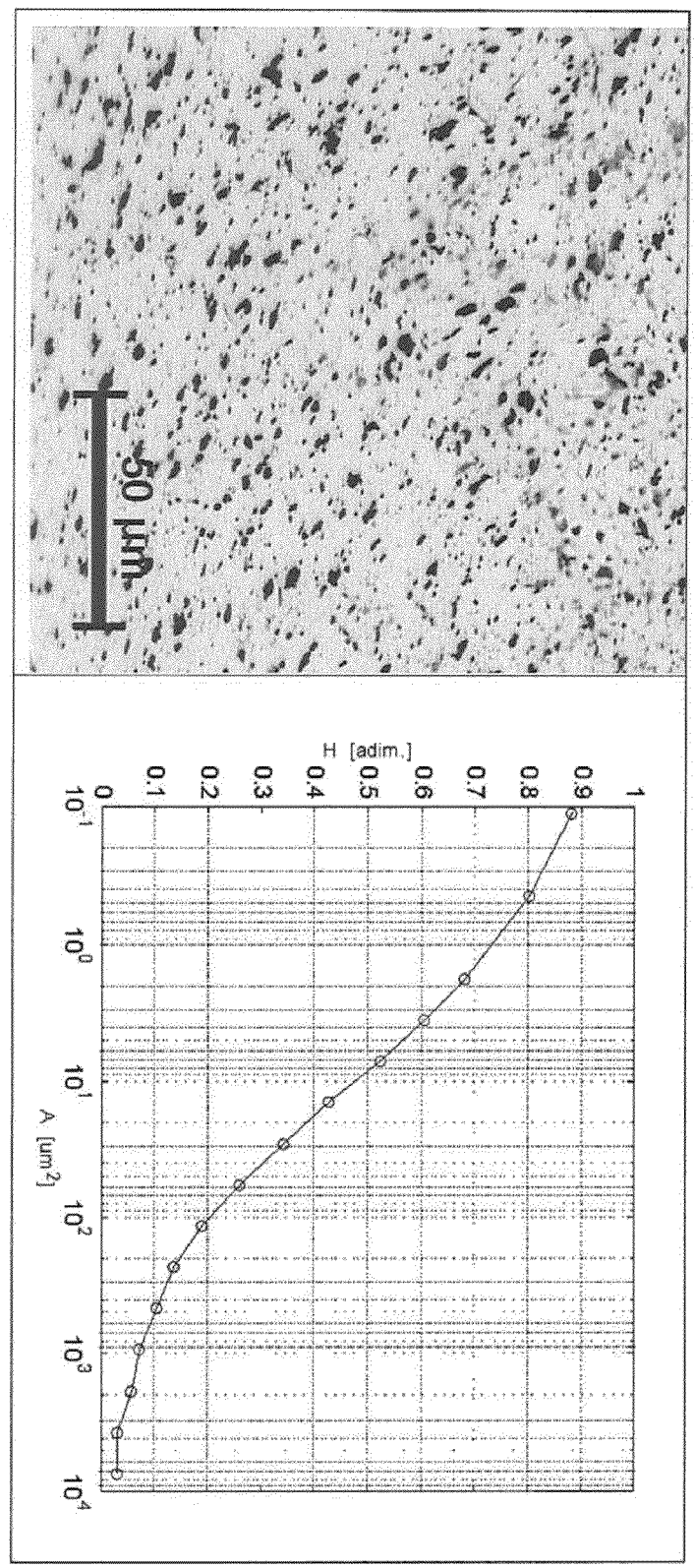
FIG. 2h is an image taken with an optical microscope of the product obtained from Comparative Example 5a and a corresponding mixing diagram with respect to the region area.

FIGS. 2a and 2b illustrate two particulate expandable compositions, having a different quantity of graphite material, according to the first scheme of controlled inhomogeneity. The cavities, essentially free of graphite material, appear as a clearer shade of grey. Comparative Example 5a, in FIG. 2h, is different, as it does not show the cavities.

FIGS. 2c to 2g show particulate expandable compositions resulting in the second scheme of controlled inhomogeneity. In particular, the magnified photos of FIGS. 2c and 2e show that preferably the graphite material is included in the dispersed, non-vinyl aromatic phase. The shape and size of the domains of the dispersed phase depend on the process conditions and on the type of concentrate of graphite material used. The graphite material proves to be concentrated in the domains. The affinity between the non-vinyl aromatic phase used and the graphite material influences the distribution of the latter inside the domains. For example, it is possible to obtain a distribution in compact agglomerates (as in FIG. 2c), or sub-domains grouped in a bunch (as in FIG. 2e), or in a dendritic structure (as in FIG. 2g).

The minimal mixing areas evaluated for the Examples and Comparative Examples are summarized in Table 2. It is evident that the samples produced show a minimal mixing area, significantly larger than that of the Comparative Examples. This is in direct correlation with the uniformity in the distribution of the graphite material. The photo in FIG. 2h, produced from an expandable granulate relating to Comparative Example 5a, shows a dispersion of the graphite material which can be considered qualitatively as homogeneous. A minimal mixing area (MMA) equal to 30 $\mu m^2$ corresponds to this. Examples in FIGS. 2a and 2b, corresponding to the first scheme of controlled inhomogeneity scheme, show a much larger minimal mixing area (68 and 98 $\mu m^2$). Examples in FIGS. 2c, 2d, 2f, corresponding to the second scheme of controlled inhomogeneity, show a minimal mixing area about an order of magnitude larger (equal to 683, 522 and 435 $\mu m^2$, respectively). These values of minimal mixing area correspond to an inhomogeneous degree of dispersion of the graphite material, as shown in the corresponding optical microscope photos.

Generally by incrementing the content of athermanous material, an increase of the minimal mixing area is obtained.

The particle size distribution of the particulate, expandable composites is narrow, in spite of the incorporation of high quantities of graphite material and other inorganic fillers (see Examples 7, 11 and 14). This may make sieving operations not necessary, otherwise necessary for warranting a good processability of the product (see Comparative Examples 6a to 6e).

Table 3 reports the thermal conductivity and capture cross sections estimated for some expanded samples relating to the Examples and Comparative Examples described herein.

Figure 3:
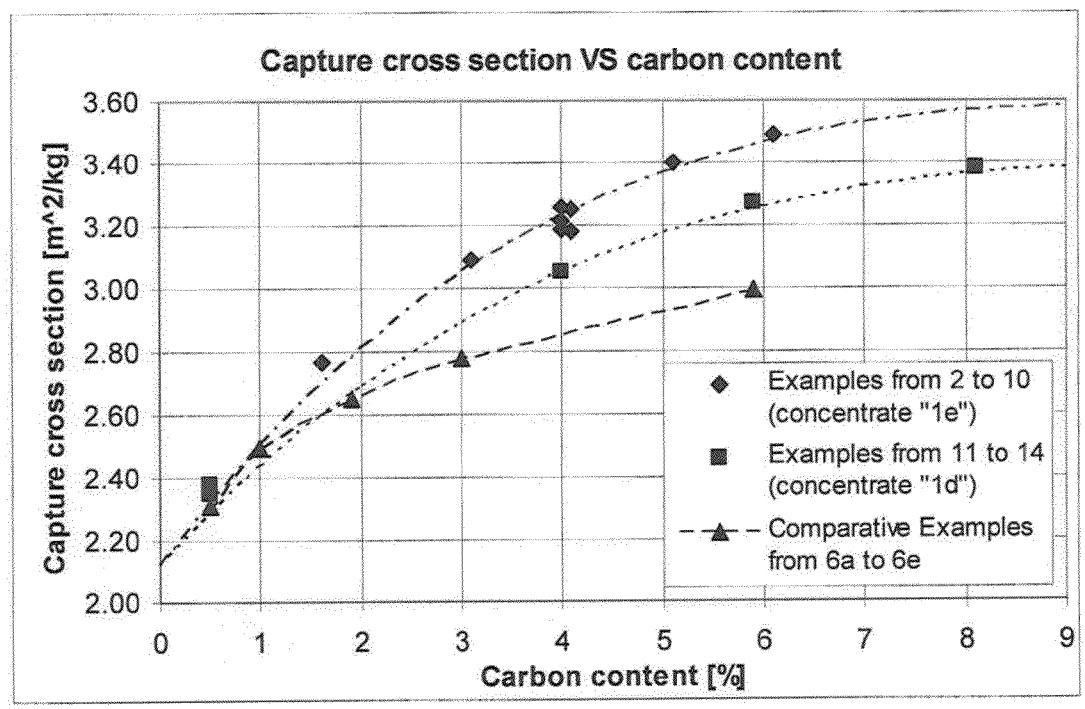
FIG. 3 is a graph of a capture cross section vs carbon content for selected Examples and Comparative Examples.

FIG. 3 shows the different adsorption capture cross sections of molded objects. Data are divided into three groups.

The first group shows data from Example 2 to 10, i.e., the expanded materials produced starting from the concentrate of Example 1e. The second collects data from Examples 11 to 14, i.e., the expanded materials produced starting from the concentrate of Example 1d. The last series refers to data on expanded materials obtained from Comparative Examples 6a to 6e.

As previously described, the more the capture cross section is a linear function of the content of graphite material, the more the efficacy of the same in blocking infrared radiation is maximized. Vice versa, a decrease in the slope of the curve with an increase in the graphite material indicates a corresponding decrease in efficacy.

The experimental data reproduced in the graph show a considerable reduction in the efficacy when the content of graphite material is over about 1% by weight.

Surprisingly the expanded test sample does not show the same reduction in efficacy observed on the samples of the comparative examples. When the content of graphite material is lower than about 1%, there is no substantial improvement with respect to the known art. For higher contents of material, however, the difference of capture cross section between our products and the state of the art is significant and, what even is more important, increases regularly with an increase in the graphite content.

Those skilled in the art would consider homogeneity of the graphite distribution as being an essential characteristic for obtaining optimal blocking capacities of infrared radiation, with a consequent reduction in the resulting thermal conductivity. Vice versa, even if the structured inhomogeneity of our expandable composites increases with an increase in the amount of graphite material in the composite, it proves to result in enhanced performances in the thermal insulation.

Without this improvement, it would be useless to increase the graphite material above 4% (see FIG. 3).

Besides, Table 3 shows the results of the fire tests according to the regulation DIN 4192, B2. The expanded materials produced in the Examples normally show a good fire performance (see Example 5, compared with Examples 13 and 4, and Example 14). In spite of this, the increment in the amount of self-extinguishing agents necessary for passing the fire test is slight (see Example 7 and Example 10).

The end products obtained from the expandable granules which show the second scheme of controlled inhomogeneity, even at high contents of graphite material, show a dielectric rigidity normally equivalent to the corresponding products without graphite material (see Table 6, Example 23 and comparison with Comparative Example 2). This is surprising, as graphite material is a good electrical conductor.

As can be seen from Table 3 (Examples 10, 11 and 14), when high contents of graphite material are used, there is an apparent decrease in the capture cross section at high densities. Actually, this is caused by the increase in thermal conductivity of the composite material, which essentially is due to the extremely high thermal conductivity of the graphite material (about 20-500 W/m.k), if compared with the typical values of a vinyl aromatic polymer (about 0.1-0.5 W/m.k).

Surprisingly, with the same amount of graphite material, the thermal conductivity of the compound is lower if the end-products are produced from expandable particulates showing the second scheme of structured inhomogeneity scheme (compare Example 23 with Comparative Example 6a, both having almost the same amount of graphite material).

In this way, in medium or high density foams, it is possible to increase the content of graphite material and therefore the absorption of infrared radiation, without a substantial increase in the resulting thermal conductivity.

As shown in Table 5, in spite of the reduced content of expanded system and the high concentration of inorganic material, generally the expandable particles can be easily processed to provide low density expanded foams. Furthermore, the expansion and molding times are comparable or even better with respect to the corresponding products with graphite materials. The percentage of broken cells is not significantly different from foams not containing graphite material, even if one skilled in the art could claim that inorganic fillers which are insoluble in the matrix could deteriorate the cell walls.

Herein, the terms "graphite material," "graphitic carbon" and "non-graphitic carbon" are defined according to the IUPAC terminology in: "RECOMMENDED TERMINOLOGY FOR THE DESCRIPTION OF CARBON AS A SOLID". IUPAC Recommendations, 1995.

Herein, the term "part" implicitly refers to "parts by weight," unless otherwise specified. The same applies to the percentage values.

This disclosure is described in detail with particular reference to examples of the same, but it is understood that variations and modifications can be applied within the spirit of the disclosure. While it is evident that the examples which are merely illustrative of the disclosure herein, it is understood that numerous modifications and other examples can be made thereto by those skilled in the art. The appended claims therefore encompass these modifications and examples.

TABLE 2

| EXAMPLES | Actual carbon content (%) | Actual HBCD content (%) | Minimal mixing area ($\mu m^2$) | Void fraction (%) | Shape factor | Granule sieve range (mm) |
| --- | --- | --- | --- | --- | --- | --- |
| 2 | 4.1 | 2.4 | 54 | 5.5 | 0.97 | 0.9-1.4 |
| 3 | 3.8 | 2.3 | 67 | 5.3 | N.A. | 0.9-1.4 |
| 4 | 4 | 2.5 | 62 | 5.9 | 0.91 | 0.9-1.4 |
| 5 | 4.1 | 1.0 | 79 | 5.2 | N.A. | 0.7-1.0 |
| 6 | 4.0 | 2.4 | 81 | 5.3 | 0.85 | 0.7-1.0 |
| 7 | 5.1 | 2.5 | 90 | 7.6 | 0.78 | 0.9-1.4 |
| 8 | 3.1 | 1.7 | 68 | 4.2 | 0.95 | 0.9-1.4 |
| 9 | 1.6 | 1.2 | 60 | 3.8 | 0.92 | 0.9-1.4 |
| 10 | 6.1 | 3.2 | 98 | 7.5 | 0.73 | 0.9-1.4 |
| 11 | 5.9 | 3.0 | 100 | 8.9 | 0.80 | 0.9-1.4 |
| 12 | 4 | 2.5 | 51 | 4.0 | 0.92 | 0.9-1.4 |
| 13 | 0.5 | 1.1 | 40 | 1.5 | 0.95 | 0.9-1.4 |
| 14 | 8.1 | 2.5 | 109 | 12.5 | 0.71 | 0.9-1.4 |
| 15 | 2.9 | 1.8 | 75 | 8.5 | N.A. | 0.9-1.4 |
| 16 | 3.1 | 1.9 | 79 | N.A. | N.A. | 0.9-1.4 |
| 17 | 2.8 | 1.6 | 73 | N.A. | 0.78 | 1.2-1.8 |

TABLE 2-continued

| EXAMPLES | Actual carbon content (%) | Actual HBCD content (%) | Minimal mixing area (μm²) | Void fraction (%) | Shape factor | Granule sieve range (mm) |
|---|---|---|---|---|---|---|
| 18 | 2.7 | 1.7 | 86 | 9.5 | N.A. | 0.8-1.4 |
| 19 | 4.1 | 2.4 | 70 | 5.3 | 0.9 | 0.9-1.4 |
| 20 | 4 | 2.5 | N.A. | 7.9 | N.A. | 0.9-1.6 |
| 21 | 3.9 | 2.5 | 683 | 9.8 | N.A. | 0.9-1.6 |
| 22 | 3.8 | N.A. | 522 | 6.3 | N.A. | 0.9-1.6 |
| 23 | 3.8 | N.A. | 435 | 5.1 | N.A. | 0.9-1.6 |
| 24 | 5.9 | N.A. | N.A. | N.A. | N.A. | 0.9-1.6 |
| Comparative Examples | | | | | | |
| 2 | 0 | 0.8 | N.A. | <0.5 | 0.97 | 0.9-1.4 |
| 3 | 4.1 | 2.6 | N.A. | <0.5 | N.A. | 0.4-2.2 |
| 4 | 3.9 | 2.5 | 23 | <0.5 | N.A. | 0.8-1.4 |
| 5a | 3.9 | 2.0 | 31 | <0.5 | N.A. | 0.8-1.4 |
| 5b | 1.9 | N.A. | N.A. | <0.5 | N.A. | 0.8-1.4 |
| 5c | 0.9 | N.A. | 30 | <0.5 | N.A. | 0.8-1.4 |
| 6a | 5.9 | N.A. | N.A. | <0.5 | 1.0 | 0.4-2.2 |
| 6b | 3.0 | N.A. | N.A. | <0.5 | N.A. | 0.4-2.2 |
| 6c | 1.9 | N.A. | N.A. | <0.5 | N.A. | 0.4-2.2 |
| 6d | 1.0 | N.A. | N.A. | <0.5 | N.A. | 0.4-2.2 |
| 6e | 0.5 | N.A. | N.A. | <0.5 | N.A. | 0.4-2.2 |
| 7a | 3.1 | N.A. | N.A. | N.A. | N.A. | 0.9-1.4 |
| 7b | 3.0 | N.A. | N.A. | N.A. | N.A. | 0.9-1.4 |
| 7c | 3.1 | N.A. | N.A. | N.A. | N.A. | 0.9-1.4 |

TABLE 3

| EXAMPLES | Density (g/l) | Thermal conductivity (mW/m·k) | Capture cross section (m²/kg) | Fire test B2 DIN 4102 (success) |
|---|---|---|---|---|
| Ex. 2 | 11.1 | 30.7 | 3.25 | — |
| Ex. 3 | 15.75 | 29.7 | 3.20 | yes |
| Ex. 4 | 11.36 | 30.5 | 3.26 | — |
| Ex. 4 | 17.9 | 29.4 | 3.21 | yes |
| Ex. 5 | 17.53 | 29.5 | 3.18 | no |
| Ex. 6 | 16.75 | 29.6 | 3.19 | — |
| Ex. 7 | 11.25 | 30.0 | 3.40 | — |
| Ex. 7 | 18.2 | 29.2 | 3.31 | Yes |
| Ex. 8 | 12.55 | 30.8 | 3.09 | — |
| Ex. 8 | 17.91 | 29.6 | 3.12 | Yes |
| Ex. 9 | 11.45 | 33.0 | 2.77 | — |
| Ex. 9 | 18.12 | 30.8 | 2.74 | Yes |
| Ex. 10 | 12.4 | 29.5 | 3.49 | — |
| Ex. 10 | 18.2 | 29.3 | 3.28 | Yes |
| Ex. 11 | 12.4 | 30.2 | 3.27 | — |
| Ex. 11 | 17.49 | 29.9 | 3.02 | — |
| Ex. 12 | 11.47 | 31.4 | 3.05 | — |
| Ex. 12 | 17.76 | 30.1 | 2.95 | Yes |
| Ex. 13 | 12.71 | 36.0 | 2.35 | — |
| Ex. 13 | 17.46 | 33.1 | 2.38 | Yes |
| Ex. 14 | 11.96 | 29.9 | 3.38 | — |
| Ex. 14 | 17.5 | 29.4 | 3.25 | No |
| Ex. 14 | 25.4 | 29.3 | 3.15 | — |
| Ex. 15 | 19.2 | 30.0 | 2.91 | — |
| Ex. 16 | 17.1 | 30.3 | 2.94 | — |
| Ex. 17 | 15.4 | 31.0 | 2.85 | — |
| Ex. 19 | 11.81 | 30.4 | 3.25 | — |
| Ex. 19 | 17.1 | 29.5 | 3.21 | — |
| Comp. Ex. 2 | 11.05 | 41.7 | 2.05 | — |
| Comp. Ex. 3 | 12.31 | 32.1 | 2.85 | — |
| Comp. Ex. 4 | 11.75 | 32.1 | 2.90 | — |
| Comp. Ex. 5a | 17.1 | 30.2 | 2.96 | — |
| Comp. Ex. 5b | 13.5 | 32.9 | 2.65 | — |
| Comp. Ex. 5c | 11 | 36.3 | 2.43 | — |
| Comp. Ex. 6a | 10.5 | 32.1 | 2.99 | — |
| Comp. Ex. 6b | 10.5 | 33.5 | 2.78 | — |
| Comp. Ex. 6c | 10.4 | 34.6 | 2.65 | — |
| Comp. Ex. 6d | 10.8 | 35.8 | 2.50 | — |
| Comp. Ex. 6e | 11.1 | 37.7 | 2.31 | — |
| Comp. Ex. 7a | 13 | 34.7 | 2.46 | — |
| Comp. Ex. 7b | 13.5 | 33.5 | 2.56 | — |
| Comp. Ex. 7c | 18.2 | 31.3 | 2.63 | — |

TABLE 4

| Nr | Reference example | Die pressure drop (bar) | Polymer Temp. (°C.) | Water spray to composite mass ratio | Nitrogen to composite mass ratio | Void fraction (%) | Cavities: size range (μm) | Cavities: dispersion quality |
|---|---|---|---|---|---|---|---|---|
| 1* | Ex. 4 | 230 | 150 | 30 | 20 | <1 | <5 | — |
| 2 | Ex. 4 | 150 | 180 | 30 | 20 | 5.9 | 8-30 | optimum |
| 3* | Ex. 4 | 50 | 175 | 30 | 20 | — | >50 | bad |
| 4* | Ex. 4 | 140 | 170 | 30 | 0 | <1 | <5 | Not. Av. |
| 5* | Ex. 4 | 120 | 230 | 30 | 20 | 17.3 | — | bad |
| 6 | Ex. 4 | 130 | 180 | 20 | 20 | 9.2 | — | good |
| 7 | Ex. 4 | 170 | 180 | 40 | 20 | 4.8 | — | good |
| 8 | Ex. 4 | 175 | 170 | 12 | 15 | 4.2 | — | good |

*Example which is taken as comparative because of the process conditions

TABLE 5

| Nr | Reference example | $1^{st}$ expans. Expansion time (sec) | $1^{st}$ expans. Bulk density after 24 hr (g/l) | $2^{nd}$ expans. Expansion time (secs) | $2^{nd}$ expans. Bulk density after 24 hr (g/l) |
|---|---|---|---|---|---|
| 1 | Ex. 4 | 30 | 22.4 | — | — |
| 2 | Ex. 4 | 60 | 19.5 | 60 | 9.8 |
| 3 | Ex. 4 | 120 | 17.0 | 60 | 8.9 |
| 4 | Ex. 4 | 180 | 15.7 | — | — |
| 5 | Com. Ex 2 | 60 | 24.7 | 60 | 14.3 |
| 5 | Com. Ex 3 | 60 | 22.4 | 60 | 13.0 |

TABLE 6

| Nr | Example | Density (g/l) | Dielectric rigidity (kv/mm) | Thermal conductivity: conductive contribution (W/m · k) |
|---|---|---|---|---|
| 1 | Ex. 24 | 40 | 1.9 | 200 |
| 2 | Comp. Ex. 2 | 30 | 2.1 | 180 |

The invention claimed is:

1. An expandable granular composite material having a polymeric matrix suitable for preparing expanded articles having a density lower than 40 g/l and a content of closed cells of at least 60% as determined according to ASTM D-2856 comprising heterophase domains including materials not completely miscible with said polymeric matrix, and/or cavities, embedded inside the polymeric matrix, wherein said polymeric matrix is a thermoplastic synthetic polymer having at least 60% by weight, with respect to the overall weight of the matrix, of a polymer deriving from a vinyl aromatic polymer, wherein said composite material contains an expanding system and graphite material not homogeneously distributed, having a graphitization degree, calculated by the Maire and Mering formula, of at least 0.2.

2. The expandable granular composite material according to claim 1, wherein said cavities are cavities of gas and/or liquid essentially consisting of the expanding system.

3. The granular composite material according to claim 1, wherein said cavities have diameters ranging from 2 to 90 micrometers and are included in the expandable composite material in a volumetric fraction ranging from 0.5 to 20.0%.

4. The expandable granular composite material according to claim 3, wherein said cavities of gas and/or liquid, are included in a volumetric fraction ranging from 2.0 to 16.0%.

5. The expandable granular composite material according to claim 4, wherein said cavities of gas and/or liquid, are included in a volumetric fraction ranging from 3.0 to 13.0%.

6. The expandable granular composite material according to claim 1, containing heterophase domains of a material, not completely miscible with the same vinyl aromatic matrix, inside which graphite material is distributed.

7. The expandable granular composite material according to claim 1, wherein said not completely miscible material ranges from 1 to 40% by weight of the vinyl aromatic matrix.

8. The expandable granular composite material according to claim 1, wherein said not completely miscible material consists of one or more of the following (co)polymers:
   a. block or random vinyl aromatic copolymers selected from the group consisting of styrene-butadiene, styrene-butadiene-styrene, styrene-isoprene, styrene-isoprene-styrene, styrene-ethylene-butadiene-styrene (SEBS), styrene maleic anhydride co-polymers, styrene-butylacrylate copolymers, high impact polystyrene (HIPS), acrylonitrile-butadiene-styrene (ABS), styrene-acrylonitrile (SAN), styrene-ethylene-propylene (SEP);
   b. polymers based on olefins, selected from the group consisting of poly(ethylene-vinyl acetate) (EVA), polypropylene, polyethylene (PE), polybutylene terephthalate (PBT) or polyethylene terephthalate (PET) and relative blends and interpolymers with polystyrene;
   c. condensation (co)polymers selected from the group consisting of polycarbonates and polyesters, (meth)acrylic polymers, polyamides, polylactates and relative blends.

9. The expandable granular composite material according to claim 1, wherein said not completely miscible material consists of one or more of the following materials: polyalkylene glycol, wherein the alkenyl group contains from 2 to 5 carbon atoms and has a molecular weight ranging from 400 to 10,000 and the corresponding esters; mineral essences, petrolatum, triglycerides, petroleum oil, water, polybutylene synthetic fluids, saturated and unsaturated fatty acids with corresponding esters and salts; esters of sorbitane.

10. The expandable granular composite material according to claim 1, wherein said expanding system consists of an expanding agent or a blend of expanding agents.

11. The expandable granular composite material according to claim 1, wherein said graphite material has a stacking height of the crystallites $LC_{002}$ of 7 to 150 nm and a coherence length of the crystallites $La_{100}$ of 10 to 200 nm.

12. The expandable granular composite material according to claim 1, wherein said graphite material essentially consists of natural or artificial graphite, graphite intercalation compounds, expanded graphite, colloidal graphite, graphitized coke or pitch, pyrolytic carbon, graphitized carbon, carbon nanofibers.

13. The expandable granular composite material according to claim 1, wherein the content of graphite material ranges from 1.0 to 30.0% by weight, calculated with respect to the overall weight of the composite material.

14. The expandable granular composite material according to claim 1, which contains up to 15% by weight of carbon black with respect to the overall weight of the composite material.

15. The expandable granular composite material according to claim 1, which contains up to 40% by weight, with respect to the overall weight of the composite material, of one or more of the following polymers or copolymers:
   a. block or random vinyl aromatic copolymers selected from the group consisting of styrene-butadiene, styrene-butadiene-styrene, styrene-isoprene-styrene, styrene-ethylene-butadiene-styrene (SEBS), styrene-butylacrylate copolymers, high impact polystyrene (HIPS), acrylonitrile-butadiene-styrene (ABS), styrene-acrylonitrile (SAN), styrene-ethylene-propylene (SEP);
   b. polymers based on olefins, selected from the group consisting of poly(ethylene-vinyl acetate) (EVA), polypropylene, polyethylene (PE), polybutylene terephthalate (PBT) or polyethylene terephthalate (PET) and relative blends and interpolymers with polystyrene;
   c. condensation (co)polymers selected from the group consisting of polycarbonates and polyesters, (meth)acrylic polymers, polyamides, polylactates and relative blends.

16. The expandable granular composite material according to claim 1, which contains from 0.5 to 15% by weight, calculated with respect to the overall weight of the composite material, of a brominated organic compound having a bromine content of over 30% by weight, and from 0.1 to 1.5% by weight, based on the overall weight of the composite material, of a compound having one or more labile bonds between two carbon atoms, or between two oxygen atoms, or between two nitrogen atoms.

17. The expandable granular composite material according to claim 16, wherein the brominated organic compound is hexabromocyclododecane, and the compound with a labile bond is 2,3-dimethyl-2,3-diphenyl-butane.

18. The expandable granular composite material according to claim 1, wherein granules in the granular composite material have an essentially ellipsoidal shape and a shape factor of the granules ranges from 0.6 to 0.99.

19. The expandable granular composite material according to claim 18, wherein the shape factor of the granules ranges from 0.7 to 0.98.

20. The expandable granular composite material according to claim 1, wherein content of graphite material ranges from 2.0 to 15.0% by weight, calculated with respect to the overall weight of the composite material.

21. The expandable granular composite material according to claim 1, wherein a minimal mixing area of the graphite material ranges from 35 to 3,000 $\mu m^2$.

22. The expandable granular composite material according to claim 21, wherein the minimal mixing area ranges from 45 to 1,000 $\mu m^2$.

23. The expandable granular composite material according to claim 1, wherein the graphite material has a graphitization degree, calculated by the Maire and Mering formula, ranging from 0.3 to 0.95.

24. A composite foam for thermal insulation produced from the expandable granular composite materials according to claim 1, having a density lower than 40 g/l and a content of closed cells of at least 60%, as determined according to ASTM D-2856.

25. A method for producing expandable granular composite materials according to claim 1, comprising:
   a. mass/solution polymerizing a vinyl aromatic monomer and, optionally, co-monomers, together with a graphite material, whose main portion is fed as a concentrate;
   b. devolatilizing said partially reacted composition in a devolatilizer;
   c. cooling the resulting composition to a temperature ranging from Tc−25° C. to Tc+25° C., wherein Tc is a critical temperature of an expanding system;
   d. adding said expanding system to the cooled composition (b) and, optionally, other additives selected from the group consisting of vinyl aromatic and non-vinyl aromatic polymers, flame-retardants, antioxidants, nucleating or lubricating agents, maintaining the pressure above the critical pressure of the expanding system;
   e. mixing said additives and said expanding system with the polymeric composition by means of static or dynamic mixers for a selected minimum residence time;
   f. optionally, cooling the resulting mixture to at least 50° C. more than the glass transition temperature of the vinyl aromatic polymer;
   g. extruding said mixture through die holes, the diameters of said holes being within the range of 0.3 to 1.5 mm;
   h. reducing said extruded mixture to granules having a volume ranging from 0.03 to 8 mm³ with a set of rotating knives, in an interrupted water spray granulator, pressurized at over 1.5 barg.

26. A method for producing expandable granular composite materials according to claim 1, comprising:
   mass/solution polymerizing a vinyl aromatic monomer and, optionally, co-monomers;
   adding a graphite material to the partially reacted mixture, whose main portion is fed as a concentrate;
   devolatilizing said partially reacted composition in a devolatilizer;
   cooling the resulting composition to a temperature ranging from Tc−25° C. to Tc+25° C., wherein Tc is a critical temperature of an expanding system;
   adding said expanding system to the cooled composition (b) and, optionally, other additives selected from the group consisting of vinyl aromatic and non-vinyl aromatic polymers, flame-retardants, antioxidants, nucleating or lubricating agents, maintaining the pressure above the critical pressure of the expanding system;
   mixing said additives and said expanding system with the polymeric composition by means of static or dynamic mixers for a selected minimum residence time;
   optionally, cooling the resulting mixture to at least 50° C. more than the glass transition temperature of the vinyl aromatic polymer;
   extruding said mixture through die holes, the diameters of said holes being within the range of 0.3 to 1.5 mm; and
   reducing said extruded mixture to granules having a volume ranging from 0.03 to 8 mm³ with a set of rotating knives, in an interrupted water spray granulator, pressurized at over 1.5 barg.

27. A method for producing particulate, expandable composite materials according to claim 1, comprising:
   i. mass/solution polymerizing a vinyl aromatic monomer and, optionally, co-monomers;
   ii. devolatilizing said partially reacted composition in a devolatilizer;
   iii. cooling the resulting composition to a temperature ranging from Tc−25° C. to Tc+25° C., wherein Tc is a critical temperature of the expanding system;
   iv. preparing a side-stream comprising a graphite material whose main proportion is fed as a concentrate and, optionally, other additives selected from the group consisting of vinyl aromatic and non-vinyl aromatic polymers, flame-retardants, antioxidants, nucleating agents and lubricating agents;
   v. adding an expanding system and the side-stream (iv) to the cooled composition (iii), maintaining the pressure over the critical pressure of the expanding system;
   vi. mixing said additives and said expanding system with the polymeric composition by means of static or dynamic mixers for a selected minimum residence time;
   optionally, cooling the resulting mixture to at least 50° C. more than the glass transition temperature of the vinyl aromatic polymer;
   extruding said mixture through die holes, the diameters of said holes being within the range of 0.3 to 1.5 mm; and
   reducing said extruded mixture to granules having a volume ranging from 0.03 to 8 mm³ with a set of rotating knives, in an interrupted water spray granulator, pressurized at over 1.5 barg.

28. A method for producing particulate, expandable composite materials according to any of the previous claim 1, comprising:
   A. mass/solution polymerizing a vinyl aromatic monomer and, optionally, co-monomers;
   B. devolatilizing said partially reacted composition in a devolatilizer;
   C. cooling the resulting composition to a temperature ranging from Tc−25° C. to Tc+25° C., wherein Tc is a critical temperature of the expanding system;
   D. preparing a side-stream comprising a graphite material whose main proportion is fed as a concentrate and, optionally, other additives selected from the group consisting of vinyl aromatic and non-vinyl aromatic polymers, flame-retardants, antioxidants, nucleating agents and lubricating agents;

E. adding an expanding system and mixing it with the side-stream;

F. adding a resulting stream to the feeding of the main polymer, maintaining the pressure over a critical pressure of the expanding system; and G. mixing said additives and said expanding system with the polymeric composition by means of static or dynamic mixers for a selected minimum residence time;

H. optionally, cooling the resulting mixture to at least 50° C. more than the glass transition temperature of the vinyl aromatic polymer;

I. extruding said mixture through die holes, the diameters of said holes being within the range of 0.3 to 1.5 mm; and J. reducing said extruded mixture to granules having a volume ranging from 0.03 to 8 mm$^3$ with a set of rotating knives, in an interrupted water spray granulator, pressurized at over 1.5 barg.

29. The method according to claim 25, wherein the vinyl aromatic monomer and, optionally, co-monomers, is polymerized until a conversion ranging from 60 to 90% is reached.

30. A method for producing particulate, expandable composite materials according to claim 1, comprising:
   feeding a vinyl aromatic polymer to an extruder, optionally together with other (co)polymers;
   cooling the resulting composition to a temperature ranging from Tc−25° C. to Tc+25° C., wherein Tc is a critical temperature of the expanding system;
   preparing a side-stream comprising a graphite material whose main proportion is fed as a concentrate and, optionally, other additives selected from the group consisting of vinyl aromatic and non-vinyl aromatic polymers, flame-retardants, antioxidants, nucleating agents and lubricating agents;
   adding an expanding system and the side-stream to the cooled composition, maintaining the pressure over the critical pressure of the expanding system;
   mixing said additives and said expanding system with the polymeric composition by means of static or dynamic mixers for a selected minimum residence time;
   optionally, cooling the resulting mixture to at least 50° C. more than the glass transition temperature of the vinyl aromatic polymer;
   extruding said mixture through die holes, the diameters of said holes being within the range of 0.3 to 1.5 mm; and
   reducing said extruded mixture to granules having a volume ranging from 0.03 to 8 mm$^3$ with a set of rotating knives, in an interrupted water spray granulator, pressurized at over 1.5 barg.

31. A method for producing particulate, expandable composite materials according to claim 1, comprising:
   a1. feeding a vinyl aromatic polymer to an extruder, optionally, together with other (co)polymers;
   b1. polymerizing a vinyl aromatic polymer and, optionally, co-monomers, until a conversion ranging from 60 to 90% is reached;
   c1. devolatilizing said partially reacted composition (b1) in a devolatilizer;
   d1. mixing the polymeric stream resulting from step (a1) with the stream resulting from step (c1), in a mass ratio (a1):(c1) within the range of 5:95 to 45:55; and
   e1. cooling the resulting composition to a temperature ranging from Tc−25° C. to Tc+25° C., wherein Tc is a critical temperature of the expanding system;
   f1. preparing a side-stream comprising a graphite material whose main proportion is fed as a concentrate and, optionally, other additives selected from the group consisting of vinyl aromatic and non-vinyl aromatic polymers, flame-retardants, antioxidants, nucleating agents and lubricating agents;
   g1. adding an expanding system and the side-stream to the cooled composition, maintaining the pressure over the critical pressure of the expanding system;
   h1. mixing said additives and said expanding system with the polymeric composition by means of static or dynamic mixers for a selected minimum residence time;
   i1. optionally, cooling the resulting mixture to at least 50° C. more than the glass transition temperature of the vinyl aromatic polymer;
   j1. extruding said mixture through die holes, the diameters of said holes being within the range of 0.3 to 1.5 mm; and
   k1. reducing said extruded mixture to granules having a volume ranging from 0.03 to 8 mm$^3$ with a set of rotating knives, in an interrupted water spray granulator, pressurized at over 1.5 barg.

32. A method for the production of particulate, expandable composite materials according to claim 30, wherein up to 50% by weight of the polymers fed to said extruder consists of particulate, expandable polystyrene, having an undesired particle size, and waste material.

33. A method for producing particulate, expandable composite materials according to claim 1, comprising:
   a2. polymerizing a vinyl aromatic monomer, and optionally co-monomers, until a conversion ranging from 60 to 90% is reached;
   b2. devolatilizing said partially reacted composition in a devolatilizer;
   c2. feeding a graphite material whose main proportion is fed as a concentrate and, optionally, other additives, to a tank of the devolatilizer, in correspondence with discharging the devolatilized composition;
   d2. cooling the resulting composition to a temperature ranging from Tc−25° C. to Tc+25° C., wherein Tc is a critical temperature of an expanding system;
   e2. adding said expanding system to the cooled composition and, optionally, other additives selected from the group consisting of vinyl aromatic and non-vinyl aromatic polymers, flame-retardants, antioxidants, nucleating or lubricating agents, maintaining the pressure above the critical pressure of the expanding system;
   f2. mixing said additives and said expanding system with the polymeric composition by means of static or dynamic mixers for a selected minimum residence time;
   g2. optionally, cooling the resulting mixture to at least 50° C. more than the glass transition temperature of the vinyl aromatic polymer;
   h2. extruding said mixture through die holes, the diameters of said holes being within the range of 0.3 to 1.5 mm; and
   i2. reducing said extruded mixture to granules having a volume ranging from 0.03 to 8 mm$^3$ with a set of rotating knives, in an interrupted water spray granulator, pressurized at over 1.5 barg.

34. A method for producing particulate, expandable composite materials according to claim 1, comprising:
   a3. polymerizing a vinyl aromatic monomer and, optionally, co-monomers until a conversion ranging from 60 to 90% is reached;
   b3. devolatilizing said polymerized composition in a devolatilizer;
   c3. adding a graphite material whose main proportion is fed as a concentrate and, optionally, other additives to the devatilized composition (b3), in a discharge stream of a pump which collects the composition from the devolatilizer;

d3. cooling the resulting composition to a temperature ranging from Tc−25° C. to Tc+25° C., wherein Tc is a critical temperature of an expanding system;

e3. adding said expanding system to the cooled composition and, optionally, other additives selected from the group consisting of vinyl aromatic and non-vinyl aromatic polymers, flame-retardants, antioxidants, nucleating or lubricating agents, maintaining the pressure above the critical pressure of the expanding system;

f3. mixing said additives and said expanding system with the polymeric composition by means of static or dynamic mixers for a selected minimum residence time;

g3. optionally, cooling the resulting mixture to at least 50° C. more than the glass transition temperature of the vinyl aromatic polymer;

h3. extruding said mixture through die holes, the diameters of said holes being within the range of 0.3 to 1.5 mm; and i3. reducing said extruded mixture to granules having a volume ranging from 0.03 to 8 mm$^3$ with a set of rotating knives, in an interrupted water spray granulator, pressurized at over 1.5 barg.

35. A method for producing particulate, expandable composite materials according to claim 1, comprising:

a4. mixing a graphite material with at least one filler selected from the group consisting of vinyl aromatic and non-vinyl aromatic polymers, derivatives of glycols, fatty acids and corresponding esters; and at least one additive selected from the group consisting of thickening agents, dispersing agents, lubricants, flame-retardants, antioxidants and nucleating agents;

b4. bringing the mixture to such a temperature that the resulting composition is in the molten phase and at such a pressure that the vapor phase is less than 1% by weight with respect to the total weight of the mixture; and c4. mass/solution polymerizing a vinyl aromatic monomer and, optionally, co-monomers, together with a graphite material, whose main portion is fed as a concentrate;

d4. devolatilizing said partially reacted composition in a devolatilizer;

e4. cooling the resulting composition to a temperature ranging from Tc−25° C. to Tc+25° C., wherein Tc is a critical temperature of an expanding system;

f4. adding said expanding system to the cooled composition and, optionally, other additives selected from the group consisting of vinyl aromatic and non-vinyl aromatic polymers, flame-retardants, antioxidants, nucleating or lubricating agents, maintaining the pressure above the critical pressure of the expanding system;

g4. mixing said additives and said expanding system with the polymeric composition by means of static or dynamic mixers for a selected minimum residence time;

h4. optionally, cooling the resulting mixture to at least 50° C. more than the glass transition temperature of the vinyl aromatic polymer;

i4. extruding said mixture through die holes, the diameters of said holes being within the range of 0.3 to 1.5 mm; and j4. reducing said extruded mixture to granules having a volume ranging from 0.03 to 8 mm$^3$ with a set of rotating knives, in an interrupted water spray granulator, pressurized at over 1.5 barg;

wherein the mixture (b4) is the concentrate of graphite material.

36. A method for producing particulate, expandable composite materials according to claim 25, wherein the graphite material is fed as a concentrate, in a proportion ranging from 80 to 100% by weight, with respect to the overall weight of the graphite material, the remaining 0-20% being fed as such.

* * * * *

UNITED STATES PATENT AND TRADEMARK OFFICE
CERTIFICATE OF CORRECTION

| | |
|---|---|
| PATENT NO. | : 8,268,902 B2 |
| APPLICATION NO. | : 12/600688 |
| DATED | : September 18, 2012 |
| INVENTOR(S) | : Casalini et al. |

It is certified that error appears in the above-identified patent and that said Letters Patent is hereby corrected as shown below:

Page 1 of 1

<u>In Column 28</u>

At line 33 and at line 44, please change "Example 11" to --Example 1i--.

<u>In Column 40</u>

At line 56 and 57 (Claim 28), please change "according to any of the previous Claim 1, comprising" to --according to claim 1, comprising--.

Signed and Sealed this
Twenty-sixth Day of February, 2013

Teresa Stanek Rea
*Acting Director of the United States Patent and Trademark Office*